(12) United States Patent
Moeller

(10) Patent No.: US 10,990,499 B2
(45) Date of Patent: Apr. 27, 2021

(54) MANAGING VISITOR ACCESS

(71) Applicant: MyOmega Systems GmbH, Nuremberg (DE)

(72) Inventor: Bernd Moeller, Henfenfeld (DE)

(73) Assignee: MyOmega Systems GmbH, Nuremberg (DE)

( * ) Notice: Subject to any disclaimer, the term of this patent is extended or adjusted under 35 U.S.C. 154(b) by 0 days.

(21) Appl. No.: 16/793,151

(22) Filed: Feb. 18, 2020

(65) Prior Publication Data

US 2020/0202650 A1 Jun. 25, 2020

Related U.S. Application Data

(63) Continuation of application No. 16/636,696, filed as application No. PCT/IB2019/000943 on Aug. 21, 2019.

(Continued)

(51) Int. Cl.
*G05B 19/00* (2006.01)
*G05B 23/00* (2006.01)
(Continued)

(52) U.S. Cl.
CPC .......... *G06F 11/3438* (2013.01); *G06F 21/34* (2013.01); *G06K 19/07749* (2013.01);
(Continued)

(58) Field of Classification Search
CPC .... G06F 11/3438; G06F 21/34; H04W 4/021; H04W 4/023; H04W 12/00503;
(Continued)

(56) References Cited

U.S. PATENT DOCUMENTS 9,911,290 B1 3/2018 Zalewski et al.
9,990,786 B1 6/2018 Ziraknejad
(Continued)

FOREIGN PATENT DOCUMENTS

EP 2 492 878 A1 5/2016
WO WO 2018/067974 A1 4/2018

OTHER PUBLICATIONS

U.S. Appl. No. 16/636,696, filed Feb. 2, 2020, Moeller.

*Primary Examiner* — Tanmay K Shah
(74) *Attorney, Agent, or Firm* — Muirhead and Saturnelli, LLC

(57) ABSTRACT

Managing a visitor outside of a physical area includes remotely registering the visitor to an access system, installing an application on a mobile user device of the visitor, the application being authorized to access and communicate with the access system, the visitor entering personnel credentials to authorize use of the application while the visitor is outside of the physical area, and, in response to the visitor authorizing use of the application, the application and the access system exchanging data containing information about the visitor, remote executed activities of the visitor, remote data, and/or information about localization of the user device. The application may exchange data with the access system using a RESTful API. Data may be formed in a blockchain prior to being exchanged between the mobile user device and the access system. The access system may add third party information to complement and improve scheduling of the visitor.

35 Claims, 15 Drawing Sheets

Related U.S. Application Data

(60) Provisional application No. 62/750,452, filed on Oct. 25, 2018.

(51) Int. Cl.

| | | |
|---|---|---|
| *G06F 7/00* | (2006.01) | |
| *G06F 7/04* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |
| *H04B 1/38* | (2015.01) | |
| *H04B 3/00* | (2006.01) | |
| *H04Q 1/00* | (2006.01) | |
| *H04Q 9/00* | (2006.01) | |
| *G06F 11/34* | (2006.01) | |
| *H04W 4/029* | (2018.01) | |
| *G06F 21/34* | (2013.01) | |
| *G06K 19/077* | (2006.01) | |
| *G06T 17/05* | (2011.01) | |
| *H04L 9/08* | (2006.01) | |
| *H04L 9/32* | (2006.01) | |
| *H04L 29/08* | (2006.01) | |
| *H04W 4/021* | (2018.01) | |
| *G07C 9/00* | (2020.01) | |
| *H04L 9/06* | (2006.01) | |
| *G07C 9/22* | (2020.01) | |
| *G07C 9/28* | (2020.01) | |
| *H04W 4/80* | (2018.01) | |
| *G07C 9/27* | (2020.01) | |
| *H04W 12/08* | (2021.01) | |
| *H04W 12/69* | (2021.01) | |

(52) U.S. Cl.
CPC .......... *G06T 17/05* (2013.01); *G07C 9/00309* (2013.01); *G07C 9/00817* (2013.01); *G07C 9/22* (2020.01); *G07C 9/27* (2020.01); *G07C 9/28* (2020.01); *H04L 9/0637* (2013.01); *H04L 9/0643* (2013.01); *H04L 9/0894* (2013.01); *H04L 9/3226* (2013.01); *H04L 9/3234* (2013.01); *H04L 9/3247* (2013.01); *H04L 67/025* (2013.01); *H04L 67/22* (2013.01); *H04W 4/021* (2013.01); *H04W 4/029* (2018.02); *H04W 4/80* (2018.02); *H04W 12/08* (2013.01); *H04W 12/69* (2021.01); *G07C 2009/00396* (2013.01); *G07C 2009/00841* (2013.01); *H04L 2209/38* (2013.01)

(58) Field of Classification Search
CPC ... H04W 12/06; H04W 4/80; H04W 12/0051; H04W 12/08; H04W 4/029; G07C 2009/00841; G07C 2009/00396; G07C 2209/02; G07C 2209/04; G07C 2209/08; G07C 2209/63; G07C 2009/00412; G07C 9/00904; G07C 9/27; G07C 9/22; G07C 9/28; G07C 9/00817; G07C 9/00309; H04L 9/0894; H04L 9/3226; H04L 9/3247; H04L 67/22; H04L 2209/38; H04L 9/3239; H04L 9/0897; H04L 9/0637; H04L 9/3234; H04L 67/025; H04L 9/0643; G06K 19/07749; G06T 17/05

USPC .......................................... 340/5.61
See application file for complete search history.

(56) References Cited

U.S. PATENT DOCUMENTS

| | | |
|---|---|---|
| 2006/0138224 A1 | 6/2006 | Azami et al. |
| 2009/0239508 A1 | 9/2009 | Waddell |
| 2015/0079962 A1 | 3/2015 | Baker et al. |
| 2016/0173531 A1 | 6/2016 | Gupta et al. |
| 2016/0196706 A1 | 7/2016 | Tehranchi et al. |
| 2017/0365113 A1* | 12/2017 | Myers ............ G07C 9/27 |
| 2018/0005143 A1 | 1/2018 | Camargo et al. |
| 2018/0089971 A1 | 3/2018 | Campero et al. |
| 2018/0144568 A1 | 5/2018 | Lingan et al. |
| 2018/0151010 A1 | 5/2018 | Kusens et al. |
| 2018/0158267 A1 | 6/2018 | Kontturi |
| 2019/0124080 A1* | 4/2019 | Caluwaert ........... H04L 63/0861 |
| 2020/0183807 A1 | 6/2020 | Moeller |
| 2020/0184757 A1 | 6/2020 | Moeller |
| 2020/0186962 A1 | 6/2020 | Moeller |
| 2020/0226863 A1 | 7/2020 | Moeller |
| 2020/0260226 A1 | 8/2020 | Moeller |

* cited by examiner

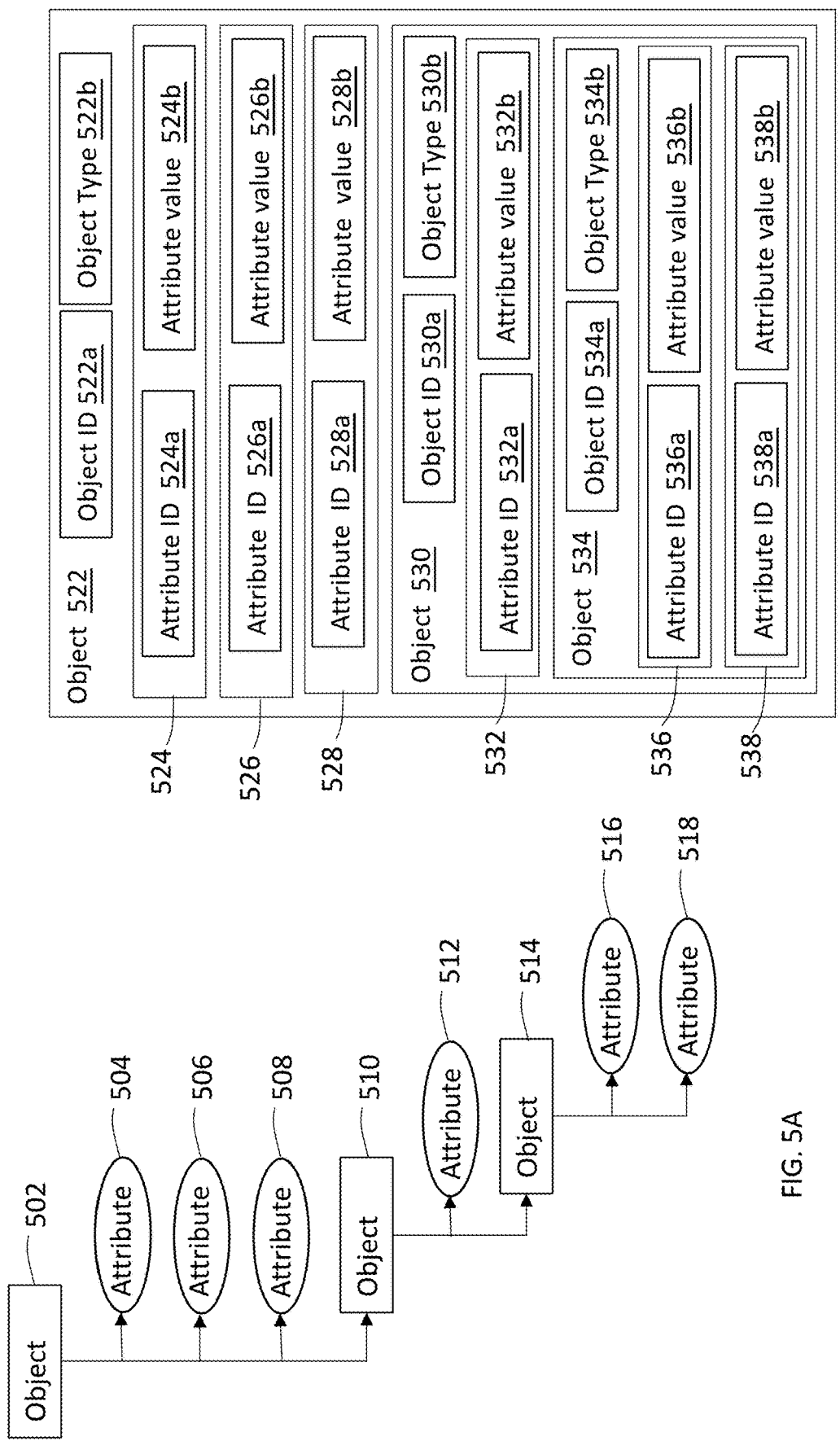

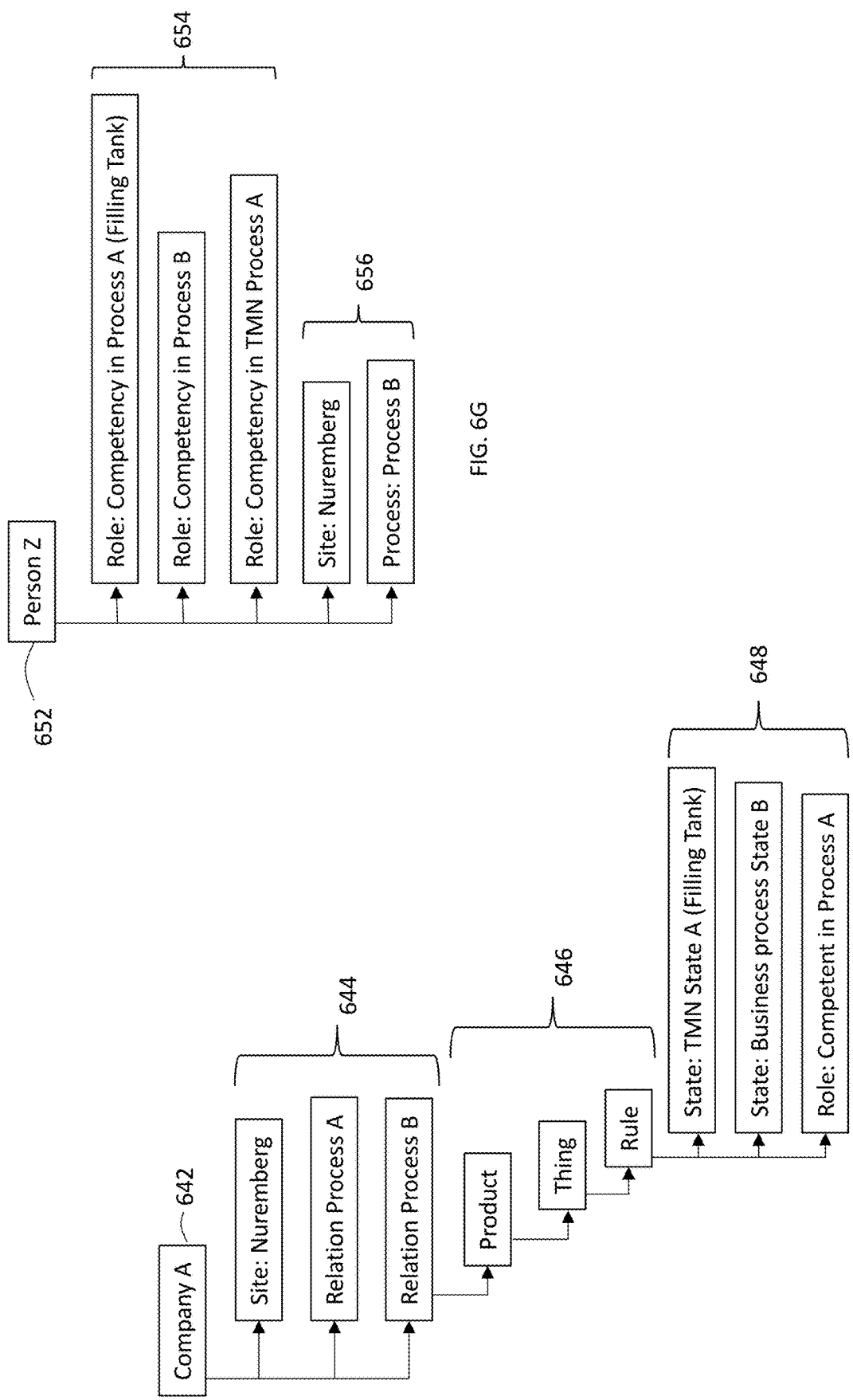

US 10,990,499 B2

MANAGING VISITOR ACCESS

CROSS-REFERENCE TO RELATED APPLICATION

This application claims priority to U.S. provisional patent application No. 62/750,452 filed on Oct. 25, 2018 titled "Security and Safety Access," which is incorporated by reference herein.

TECHNICAL FIELD

This application is directed to the field of remote monitoring and management of a user device of a visitor/employee on a site in connection with granting access to data, things and physical areas and more particularly to aspects of scheduling and data management of visitors, vehicles and goods approaching the site in connection with granting access.

BACKGROUND OF THE INVENTION

Today there are many disparate systems and procedures involved in managing visitor access to a site, building or other physical area. For example, some sites have a gate or other obstruction to control vehicles entering a site by vehicle. A driver of a vehicle may need to present identification (e.g., a driver's license) to a guard or present a card (or other item) to a scanner/reader to authenticate the identity of the driver, other passengers and/or the vehicle, and to verify that the driver, passenger(s) and/or vehicle are allowed access to the site. In some cases, the owner of the vehicle (hauler) and the driver may need to present data about the vehicle. It may also be necessary to present data about the goods using, for example, a COA (Certificate of Analysis) for chemical goods. Similarly, a building may have a lobby or entry area that serves as a reception area that is a visitor access point to a site. At the reception area, visitors may need to present identification to a guard and/or present a card (or other item) to a scanner/reader to authenticate the identity of the visitor and verify that the visitor is allowed access to the building and/or site.

At such access points to a site, information about the one or more visitors (or vehicles) may be provided manually by a visitor (e.g., orally or via a kiosk or terminal), collected manually by a security guard or receptionist, and/or collected automatically, e.g., by a scanner/reader. Such information may be used to screen visitors (e.g., against watch lists) and otherwise authenticate and/or verify authorization of the user to proceed beyond the access point into the remainder of the building or site. Such information may be used to maintain detailed logs of visits to the building or site.

Depending on security concerns, visitors may not be allowed to bring certain items into the building or site, including, for example, a camera, smart phone or any other type of device capable of recording audio or video and/or receiving or transmitting wireless communications.

SUMMARY OF THE INVENTION

According to the system described herein, managing visitor access to one or more resources within a physical area includes a mobile user device of a visitor associated to the physical area with a secure component having stored thereon at least one credential for authorizing the mobile user device to communicate transactions with other components of the system, one or more components remotely located from the mobile user device and communicatively coupled with the mobile user device, the one or more components including one or more data structures that define a plurality of entities and associate one or more attributes with the one or more entities corresponding to access to the one or more resources, and a first application to manage access of the visitor to the one or more resources based on the one or more data structures and information communicated by the mobile user device to the one or more components in one or more transactions that are authorized using the at least one credential. The credential may be a block chain credential and the transactions may be block chain transactions. The mobile user device may be locally coupled to the secure component. The secure component may be internal to the mobile user device. The entities may include a physical area, the visitor and an entity on whose behalf the visitor is acting and the information communicated by the mobile user device may include an identification of the visitor. The one or more entities may include the visitor with attributes of the visitor corresponding to access to the one or more resources, a process associated with the physical area, and one or more rules defining conditions and actions corresponding to the process. The information communicated by the mobile user device may include an identification of the visitor and the first application may manage access by the visitor to the one or more resources based at least in part on the one or more data structures defining the visitor, the process and the one or more rules. At least a first of the one or more components may be located within or in close physical proximity to the physical area. The first component may control access to the physical area. At least a first of the one or more components may not be located in close physical proximity to the physical area. The system may also include one or more servers that store transactions resulting from visitor access to the physical area as block chain transactions of a block chain. The one or more entities may include a first entity on whose behalf the visitor is acting and a second entity that controls the physical area. The one or more data structures may include one or more block chain transactions defining rules and actions constituting a smart contract between the first entity and the second entity. The first application may access the one or more block chain transactions to execute the smart contract while the visitor is within the physical area. The secure component may include a trusted platform module. The secure component may have stored thereon at least one cryptographic key for secure communication between the mobile user device and other components of the system. The mobile user device may have an application thereon to access the one or more resources within the physical area. The secure component may have stored thereon at least one secure credential for validation of the application and the first application may validate the application using the at least one secure credential thereby enabling execution of the application on the mobile user device. At least a portion of the first application may be located on at least one of the one or more components. At least a portion of the first application may be located on the mobile user device. The first application managing access of the visitor to the one or more resources may include managing access of the visitor to the physical area. The first application may remotely control the mobile user device while the user is within the physical area. The one or more attributes associated with the one or more entities may include attributes corresponding to safety of the visitor while within the physical area.

According further to the system described herein, controlling activity within a first physical area under control of a first entity includes determining a current location of a mobile user device of a user relative to the first physical area, where the mobile user device is not affiliated with the first entity and the first entity remotely controlling one or more capabilities of the mobile user device while the mobile user device is located within, or within a predefined proximity of, the first physical area. Remotely controlling may include disabling WIFI communication capabilities and disabling wireless telephony communication capabilities. Remotely controlling may include allowing GPS and near field communication capabilities to remain enabled. Controlling activity within a first physical area under control of a first entity may also include providing one or more access codes for things located within the first physical area. Determining a current location may include determining that the user device is within a predefined proximity to one or more second physical areas within the first physical area and, in response to detecting that the user device is within the predefined proximity, issuing an alert to one or more parties. The first physical area may include a reception area. Determining the current location of the mobile user device may include determining that the mobile user device is leaving the reception area and the first entity may control disabling one or more capabilities of the mobile user device in response to determining that the user is leaving the reception area. The mobile user device may have an application thereon for controlling activity within the first physical area under control of the first entity and determining the current location of the mobile user device may include determining that the mobile user device is approaching the first physical area. Controlling activity within a first physical area under control of a first entity may include, in response to determining that the mobile user device is approaching the first physical area, validating the application using a secure credential to enable execution of the application to allow the first entity to remotely control the one or more capabilities of the mobile user device while the mobile user device is located within a predefined proximity of the first physical area. Controlling activity within a first physical area under control of a first entity may include accessing a secure component that provides a secure platform having stored thereon at least one block chain credential for authorizing the mobile user device to communicate block chain transactions with one or more components affiliated with the first entity and the mobile user device using the block chain credential to communicate block chain transactions with the one or more components in connection with the first entity remotely controlling the one or more capabilities of the mobile user device. The secure component may be contained within a dongle locally coupled to the mobile user device. Remotely controlling may include allowing the user device to read QRC labels and/or detect RFID signals from things within the first physical area. In response to the detecting the mobile user device leaving the first physical area, the first entity may cease remote control of the mobile user device. A non-transitory computer-readable medium may contain software that controls activity within a first physical area under control of a first entity, the software including executable code that performs the steps described previously when executed by a processor. A system may control activity within a first physical area under control of a first entity and the system may have means that perform one or more of the steps described previously.

According further to the system described herein, issuing an alert with respect to a first physical area includes determining a location of a mobile user device of a user with respect to the first physical area controlled by a first entity, following determining the current location, remotely configuring the mobile user device to detect when the mobile user device is within a predefined proximity to one or more second physical areas within the first physical area, and, in response to detecting that the user device is within the predefined proximity, issuing the alert to one or more parties. Issuing an alert with respect to a first physical area may also include marking coordinates of the one or more second areas on a digital site map of the first physical area, where detecting that the user device is within the predefined proximity includes determining coordinates of the mobile user device relative to the digital site map using a communication network and comparing the determined coordinates of the mobile user device to the coordinates of the one or more second areas. The communication network may be GPS or Glonas. Issuing an alert with respect to a first physical area may also include placing one or more wireless beacons that transmit beacon signals relative to the one or more second physical areas, where detecting that the user device is within the predefined proximity includes the mobile user device detecting at least one of the beacon signals transmitted from the one or more wireless beacons. Placing the one or more wireless beacons may include placing a plurality of wireless beacons so that the beacon signals transmitted by the plurality of wireless beacons define a wireless detection barrier relative to the one or more second physical areas. Issuing an alert with respect to a first physical area may also include recording the issuing of the alert as a transaction as part of a blockchain. Issuing the alert may include alerting one or more representatives of the first entity. Issuing the alert may also include alerting the user. Issuing an alert with respect to a first physical area may also include accessing a secure component that provides a secure platform having stored thereon at least one block chain credential for authorizing the mobile user device to communicate block chain transactions with one or more components affiliated with the first entity and the mobile user device using the block chain credential to communicate block chain transactions with the one or more components in connection with issuing the alert. The secure component may be contained within a dongle locally coupled to the mobile user device. A non-transitory computer-readable medium may contain software that issues an alert with respect to a first physical area, the software including executable code that performs the steps described previously when executed by a processor. A system may issue an alert with respect to a first physical area and the system may have means that perform one or more of the steps described previously.

According further to the system described herein, establishing a status of a user at a physical area includes determining a presence of a mobile user device of a user at a location relative to the physical area, determining an identification of the user from the mobile user device, accessing, from a secure component included proximal to the mobile user device, a credential for authorizing the mobile user device to communicate transactions with one or more other remotely located components, using the credential to securely determine one or more first attributes of the user and one or more second attributes of one or more resources located at the physical area, and determining a status of a user with respect to the one or more resources based at least in part on the determined identification of the user, the first attributes and the second attributes. The credential may be a block chain credential and the transactions may be block chain transactions. Using the credential to securely determine attributes may include accessing one or more blocks of a blockchain on the one or more remotely located components using the credential, the one or more blocks defining the attributes. The one or more blocks may define one or more third attributes of a first entity that controls the physical area, and may define one or more fourth attributes of a second entity and determining the status of the user may be based at least on part on the third attributes and the fourth attributes. The user may not be affiliated with the first entity. Establishing a status of a user at a physical area may also include determining permissions for the user for accessing the one or more resources based at least in part on the status of the user. The mobile user device may have an application thereon that accesses the one or more resources within the physical area and the secure component may have stored thereon at least one secure credential for validation of the application. Establishing a status of a user at a physical area may also include validating the application using the at least one secure credential thereby enabling execution of the application on the mobile user device and executing the application on the mobile user device. The secure component may be contained within a dongle locally coupled to the mobile user device. The secure component may be contained within the mobile user device. A non-transitory computer-readable medium may contain software that establishes a status of a user at a physical area, the software including executable code that performs the steps described previously when executed by a processor. A system may establish a status of a user at a physical area and the system may have means that perform one or more of the steps described previously.

According further to the system described herein, using a mobile user device of a user to control access to a thing located within a physical area and having a physical locking mechanism includes determining whether a current location of the mobile user device is within a predefined proximity to the thing, accessing, from a secure component proximal to the mobile user device, a credential for authorizing the mobile user device to communicate block chain transactions with one or more other remotely located components, securely accessing one or more first attributes associated with the thing, and locking or unlocking the locking mechanism based at least in part on the one or more first attributes. The credential may be a block chain credential. Securely accessing the one or more first attributes may include accessing one or more blocks of a blockchain on the one or more remotely located components using the credential. Using a mobile user device of a user to control access to a thing located within a physical area and having a physical locking mechanism may also include determining an identification of the user from the mobile user device, wherein locking or unlocking the locking mechanism is based at least in part on the determined identification. Using a mobile user device of a user to control access to a thing located within a physical area and having a physical locking mechanism may also include communicating one or more access codes for the thing from the one or more remotely located components to the mobile user device and the mobile user device transmitting the one or more access codes to the locking mechanism to lock or unlock the locking mechanism. The mobile user device may have an application thereon for locking or unlocking the locking mechanism. Using a mobile user device of a user to control access to a thing located within a physical area and having a physical locking mechanism may also include validating the application using a secure credential to enable execution of the application and executing the application to lock or unlock the locking mechanism. The secure component may be contained within a dongle locally coupled to the mobile user device. The locking mechanism may have a QRC label and/or an RFID tag affixed thereto and determining whether the current location of the mobile user device is within a predefined proximity to the thing may include reading the QRC label and/or detecting a signal from the RFID tag. Determining whether the current location of the mobile user device is within a predefined proximity to the thing may include determining coordinates of the mobile user device using a communication network. The communication network may be GPS or Glonas. One or more wireless beacons may be located relative to the physical area, the one or more wireless beacons may transmit beacon signals and determining whether the current location of the mobile user device is within a predefined proximity to the thing may include the mobile user device detecting at least one of the beacon signals transmitted from the one or more wireless beacons. A non-transitory computer-readable medium may contain software that uses a mobile user device of a user to control access to a thing located within a physical area having a physical locking mechanism and the software may include executable code that performs one or more of the steps described previously when executed by a processor. A system that handles a mobile user device that controls access to a thing located within a physical area having a physical locking mechanism, the system having means that perform one or more of the steps described previously.

According further to the system described herein, monitoring user activity within a physical area controlled by an entity includes determining a location of a mobile user device of a user with respect to the physical area, in response to determining the location, exchanging one or more communications with one or more remotely located components associated with the entity to remotely configure the mobile user device with a digital map of the physical area, information about one or more things within the physical area and the ability to access at least one of the one or more things, storing one or more records of one or more interactions between the user device and the at least one thing relative to the digital map, and transmitting the one or more records as transactions of a blockchain to the one or more remotely located components. The at least one thing may have a QRC label and/or an RFID tag affixed thereto and remotely configuring the user device may include configuring the user device with an ability to read the QRC label and/or the RFID tag. Monitoring user activity within a physical area controlled by an entity may also include accessing, from a secure component proximal to the mobile user device, a blockchain credential for authorizing the mobile user device to communicate block chain transactions with the one or more other remotely located components. The secure component may be contained within a dongle locally coupled to the mobile user device. The secure component may be contained within the mobile user device. The mobile user device may have an application thereon to access the at least one thing, where the secure component may have stored thereon at least one secure credential for validation of the application. Monitoring user activity within a physical area controlled by an entity may also include validating the application using the at least one secure credential to enable execution of the application on the mobile user device. The secure component may have stored thereon at least one cryptographic key for secure communication between the mobile user device and other components of the system. The at least one cryptographic key may be used to exchange the one or more communications with the one or more other remotely located components. A non-transitory computer-readable medium may contain software that monitors user activity within a physical area controlled by an entity and the software may include executable code that performs one or more of the steps described previously when executed by a processor. A system may monitor user activity within a physical area controlled by an entity and the system may have means that perform one or more of the steps described previously.

According further to the system described herein, handling a mobile user device of a visitor to a physical area under control of an entity has one or more capabilities of the mobile user device remotely being disabled by the entity while the visitor is within a predefined proximity of the physical area includes detecting the mobile user device leaving the predefined proximity of the physical area and, in response to detecting the mobile user device leaving, the entity remotely enabling the one or more disabled capabilities of the mobile user device. The visitor may register a visit to the physical area. Handling a mobile user device may also include, in response to detecting the mobile user device leaving, transmitting one or more transaction blocks of a blockchain from the mobile user device to one or more remotely located components affiliated with the entity. Handling a mobile user device may also include accessing a secure component that provides a secure platform having stored thereon at least one block chain credential for authorizing the mobile user device to communicate transaction blocks of a blockchain with the one or more remotely located components and the mobile user device using the block chain credential to transmit the one or more transaction blocks. The secure component may be contained within a dongle locally coupled to the mobile user device. The secure component may be contained within the mobile user device. The one or more transaction blocks may include information associated with one or more interactions between the mobile user device and one or things within the physical area. Detecting the mobile user device leaving the predefined proximity of the area may include determining that the user device has entered a visitor reception area. An application may be associated with one or more resources corresponding to the physical areas while the visitor was within the physical area. Handling the mobile user device may also include the mobile user device continuing to be enabled to allow the user to use the first application after leaving the first physical area. A non-transitory computer-readable medium may contain software that handles a mobile user device of a visitor to a physical area under control of an entity with one or more capabilities of the mobile user device being remotely disabled by the entity while the visitor is within a predefined proximity of the physical area, the software including executable code that performs the steps described previously when executed by a processor. A system may handles a mobile user device of a visitor to a physical area that is under control of an entity with one or more capabilities of the mobile user device being remotely disabled by the entity while the visitor is within a predefined proximity of the physical area and the system may have means that perform one or more of the steps described previously.

According further to the system described herein, managing a visitor outside of a physical area includes remotely registering the visitor to an access system, installing an application on a mobile user device of the visitor, the application being authorized to access and communicate with the access system, the visitor entering personnel credentials to authorize use of the application while the visitor is outside of the physical area, and, in response to the visitor authorizing use of the application, the application and the access system exchanging data containing information about the visitor, remote executed activities of the visitor, remote data, and/or information about localization of the user device. The application may exchange data with the access system using a RESTful API of the access system. Data may be formed in a blockchain prior to being exchanged between the mobile user device and the access system. The access system may schedule a visit by the visitor in response to the application transmitting to the access system, within a defined time interval, data heartbeats containing localization data. The access system may add third party information to complement and improve scheduling of the visitor. The third party information may include load information indicating material being transported by the visitor to the physical area. The load information may include a bill of lading, a certificate of analysis, and/or safety data sheets. The load information may be sent to the access system using a blockchain and/or a hash of data corresponding to the load information. The information about the visitor may be entered using the application. The information about the visitor may be sent to the access system using a blockchain and/or a hash of data corresponding to the load information. Interaction times of the visitor may correspond to times that the visitor interacts with the application are recorded. Data corresponding to the interaction times may be sent to the access system using a blockchain and/or a hash of data corresponding to the load information. A non-transitory computer-readable medium may contain software that manages a visitor outside of a physical area, the software including executable code that performs one or more of the steps described previously when executed by a processor. A system may manage a visitor outside of a physical area and the system may have means that perform one or more of the steps described previously.

BRIEF DESCRIPTION OF THE DRAWINGS

FIG. 5A is a block diagram illustrating a data object for managing things in a thing management network, according to embodiments of the system described herein.

FIG. 5B is a block diagram illustrating a data structure of a data object for managing things in a thing management network, according to embodiments of the system described herein.

FIGS. 6A-6H illustrate examples of data objects, according to embodiments of the system described herein.

DETAILED DESCRIPTION OF VARIOUS EMBODIMENTS

Figure 1:
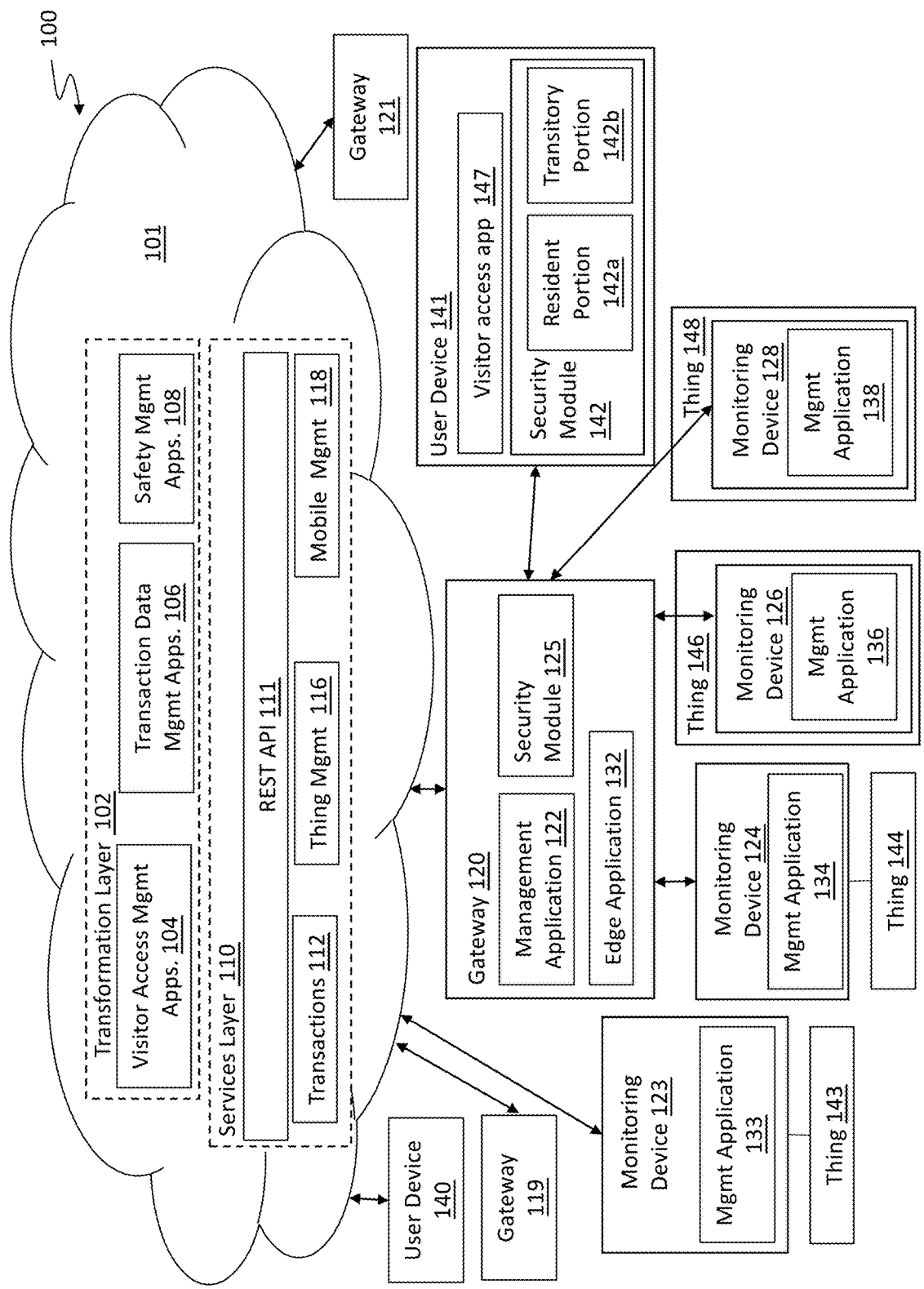
FIG. 1 is a block diagram illustrating a system for remotely monitoring and managing visitor access to a physical area and/or resources within the physical area, according to embodiments of the system described herein.

Described herein is a system for managing visitor access to a physical area, for example, a site, and to one or more places and/or things within the physical area. The system may include a mobile user device (e.g., a smart phone) in possession of a visitor to the physical area. The mobile user device may include or be locally coupled to a security module (also referred to herein as a secure component), which may include a trusted platform module (TPM) or secure element (SE), that provides a secure platform having stored thereon at least one block chain credential for authorizing the mobile user device to communicate block chain transactions with other components of the system. As used herein, "locally coupled" means either directly physically connected to (e.g., plugged into) or within a distance that enables wireless communication using Bluetooth (BT) and/or near field communication (NFC) technology. For example, the security module may be contained within a dongle or other small device that is locally coupled to the mobile user device.

The system described herein may include one or more management components remotely located from the mobile user device and communicatively coupled to communicate block chain transactions with the mobile user device. For example, the one or more management components may be, or be included within: one or more centralized servers, and/or gateways serving as intermediaries between the centralized server(s) and the mobile user device, where the gateways may provide edge computing and other functionality. The one or more management components may include one or more data structures that define a plurality of entities associated with access to the one or more resources within a physical area, for example, a person, a site, a company, a process, things, or correlated data and may associate one or more attributes with the one or more entities corresponding to access to the one or more resources, for example, safety and security attributes, states and roles, to name a few.

The system described herein may include one or more visitor access management applications to manage access by the visitor to a physical area (e.g., site) and/or the one or more resources within the physical areas. The system may also provide access to data that correlates to products and devices inside the physical areas. This access may be managed based on the one or more data structures defining entities and attributes thereof and information communicated by the mobile user device to the one or more management components. Such information may be communicated in one or more block chain transactions authorized using the at least one block chain credential stored in the secure component. Portions of the visitor access management application may be included in one or more user devices, gateways and/or servers, and may be referred to as client portions, whereas portions of the visitor access management application residing on a server (e.g., in a transformation layer of a thing management network as described in more detail below) may be referred to as a server portion of the visitor access management application. One or more client portions of one or more visitor access management applications may be referred to herein collectively as a visitor access app.

In some embodiments of the system described herein, access by a visitor to a physical area may be controlled. For example, the physical area may be under control of a first entity (e.g., an individual, company, government agency or other organization), and the visitor may have a mobile user device that is not affiliated with the first entity. For example, the visitor may be an employee of an entity other than the first entity and the mobile user device may have been issued to the visitor by the other entity. The location of the mobile user device relative to the first physical area may be determined, and the first entity may remotely control one or more capabilities of the mobile user device while the mobile user device is located within, or within a predefined proximity of, the first physical area. For example, while the visitor is in the first physical area, one or more network communication capabilities (e.g., WIFI, mobile telephony) may be disabled, and one or more other network communication capabilities (e.g., GPS, BT and NFC) may be allowed to remain enabled. In some instances, portions of the data may be globally shared by the first entity with the entity of the visitor.

In some embodiments of the system described herein, an alert may be issued with respect to a first physical area (e.g., a site or building) controlled by a first entity. A location of a mobile user device in possession of a visitor with respect to the first physical area may be determined. In response to determining the current location, the mobile user device may be configured to detect when the mobile user device is within a predefined proximity to one or more second physical areas (e.g., restricted and/or hazardous areas) within the first physical area. In response to detecting that the user device is within the predefined proximity, the alert may be issued to one or more parties, for example, one or more employees and/or security providers of the first entity. Such detection may include using geo-fencing and/or alarm barriers, as described in more detail elsewhere herein.

In some embodiments of the system described herein, a status of a user at a physical area may be established. As used herein, a user is a person using a user device. A presence of a mobile user device in possession of a user at a location relative to the first physical area may be determined, and an identification of the user may be determined from the user device. A blockchain credential may be accessed from a secure component included within or locally coupled to the mobile user device, the blockchain credential for authorizing the mobile user device to communicate blockchain transactions with one or more other remotely located components. One or more blocks of a blockchain on the one or more remotely located components may be accessed using the blockchain credential, where the one or more blocks may define one or more first attributes (e.g., roles, competencies, company) of the user and one or more second attributes (e.g., security, safety) of one or more resources located at the physical area. A status of a user with respect to the one or more resources may be determined based at least in part on the determined identification of the user, the first attributes and the second attributes. For example, it may be determined that the user is competent to use a resource and/or perform a process at a particular company site.

In some embodiments, access to a thing within a first physical area by a mobile user device in possession of a user within the first physical area may be controlled. For example, it may be determined whether a current location of the mobile user device is within a predefined proximity to the thing (e.g., device, machine, vehicle, panel, door, gate) within the first physical area, the thing having a physical locking mechanism. A blockchain credential may be accessed from a secure component (e.g., TPM or SE) included within or locally coupled to the mobile user device, where the blockchain credential is for authorizing the mobile user device to communicate block chain transactions with one or more other remotely located components. One or more blocks of a blockchain may be accessed on the one or more remotely located components (e.g., gateway or server) using the blockchain credential, where the one or more blocks may define one or more first attributes associated with the thing, for example, safety or security attributes, and one or more first attributes associated with the person, for example, role or competency of the user, and/or other attributes. The locking mechanism may be locked or unlocked based at least in part on the one or more first attributes.

In some embodiments, user activity within a first physical area controlled by a first business entity may be monitored and/or recorded. A location of a mobile user device in possession of a user with respect to the first physical area controlled by a first entity may be determined. In response to determining the location, one or more communications may be exchanged with one or more remotely located components (e.g., gateways, servers) associated with the first business entity to remotely configure the mobile user device with a digital map of the first physical area, information about one or more things within the first physical area and the ability to access at least one of the one or more things. One or more records of one or more interactions between the user device and the at least one thing relative to the digital map may be recorded, and the one or more records transmitted as transactions of a blockchain to the one or more remotely located components. The at least one thing may have at least one of a QRC label or an RFID tag affixed thereto, and the remote configuring of the user device may include configuring the user device with the ability to read at least one of a QRC label or RFID tag.

In some embodiments, communications including transactions (e.g., blockchain transactions) between a user device and other components of the thing management (or at least communications from the user device) are not permitted (e.g., WIFI and mobile telephony capabilities disabled) while the user device is within the physical area or within a predefined proximity thereof. In such embodiments, communications including transactions having information gathered during the visit by the user device are transmitted only when (e.g., immediately after) the visitor leaves the physical areas or proximity thereof, for example, when certain communication capabilities (e.g., WIFI, mobile telephony) have been restored on the user device.

In some embodiments, it may be that a visitor with or without a vehicle enters into a monitoring mode before entering the first physical area under control of a first business entity. Monitoring and data exchange may start with remote registering of the visit, allowing more precise scheduling and management of the visit. Information such as the current position of the approach to the physical area, COA (Certificate of Analysis) of the loading, the driver's license of the visitor and possibly other data may be exchanged with the reception before entering the proximity of the site, thus allowing a faster and more efficient reception and guest management. Sensitive data may be exchanged using blockchain transactions.

In some embodiments, for a mobile user device of a visitor to a first physical area under control of a first business entity, one or more capabilities of the mobile user device may be remotely disabled by a first business entity while the visitor is within, or within a predefined proximity of, the first physical area. Later, it may be detected that the mobile user device is leaving at least one of the first physical area or the predefined proximity of the area. For example, it may be detected when the visitor (e.g., in a vehicle) is approaching or passing through a security gate, or past a predefined distance from the security gate, or when the visitor is entering or existing a lobby or entry area of a building. In response to the detecting, the first business entity may remotely enable the one or more disabled capabilities.

One or more contractual relationships between parties (e.g., companies, a company and a person) may be defined using blockchain transaction records as smart contracts, which are described in more detail elsewhere. Further, one or more contractual transactions between parties per the contractual relationships may be recorded as smart contracts. For example, the acceptance of terms and conditions accepted by a user with respect to a thing management network, or a particular site associated with the thing management network, may be recorded as a smart contract. Further, one or more rules (e.g., with respect to a person, company, site, thing, process or other object) may be recorded as part of a smart contract.

Illustrative embodiments of the system described herein will now be described in relation to the drawings. It should be appreciated that the system described herein is not limited to the following illustrative embodiments, as other embodiments, for example, variations of the following illustrative embodiments, are possible, and intended to fall within the scope of the invention FIG. 1 is a block diagram illustrating a system 100 for remotely monitoring and managing visitor access to a physical area and/or resources within the physical area, according to embodiments of the system described herein. Other embodiments of the system for remotely monitoring and managing visitor access to a physical area and/or resources within the physical area, for example, variations of the system 100, are possible and are intended to fall within the scope of the invention. The system 100 also may be referred to herein as a thing management network where the things being managed are various items. That is, as used herein, things may be considered analogous to items, whether tangible or intangible. The system 100 may include any of: one or more monitoring devices 123, 124, 126 and 128; one or more gateways 119-121; one or more user devices 140, 141, a transformation layer 102, a services layer 110 and other components in a cloud 101; other components; and any suitable combination of the foregoing. It should be appreciated that, while only three gateways and four monitoring devices are shown in FIG. 1, the invention is not so limited, as any number of gateways and monitoring devices may be used, taking into consideration the feasibility given the fiscal and management costs of equipment and network, compute and storage resources.

In some embodiments, one or more monitoring devices may be coupled (e.g., physically or wirelessly) to one or more respective things, for example, as illustrated by the monitoring devices 124, 126 in relation to things 143, 144, respectively. In some embodiments, one or more monitoring devices may be contained within (e.g., as a separate component or integrally) one or more respective things, for example, as illustrated by the monitoring devices 126, 128 within things 146, 148, respectively. It should be appreciated that there may be a one-to-one relationship between monitoring devices and things, as illustrated in FIG. 1, a one-to-many relationship (i.e., one monitoring device coupled to multiple things) or a many-to-one relationship (i.e., multiple monitoring devices coupled to one thing). It should be appreciated that a thing may be any type of thing that may be managed by a thing management network, including, but not limited to, any type of thing (item) described herein.

Each of the gateways 119-121 may be coupled to the cloud 101 and to a plurality of monitoring devices; for example, the gateway 120 is coupled to the monitoring devices 124, 126 and 128. Each gateway may couple one or more monitoring devices to the cloud 101, which may include one or more servers. In some embodiments, one or more monitoring devices, e.g., the monitoring device 123, may be connected directly to the cloud 101. In such embodiments, the monitoring device 123 may be configured with any of the gateway functionality and components described herein, and treated like a gateway, at least in some respects, by the cloud 101.

In some embodiments, one or more gateways, e.g., the gateway 120, may couple one or more user devices, e.g., the user device 141, to the cloud 101. In some embodiments, one or more user devices, e.g., the user device 140, may be connected directly to the cloud 101. In such embodiments, the user device 140 may be configured with any of the gateway functionality and components described herein, and treated like a gateway, at least in some respects, by the cloud 101.

Each of the gateways 119-121 may be configured with one or more capabilities of a gateway and/or a controller as described in U.S. Pat. No. 9,509,628, titled "Managing Devices in a Heterogeneous Network," issued Nov. 29, 2016, to Bernd Moeller (hereinafter the '628 patent), including capabilities described in relation to FIGS. 1 and 2 (and elsewhere) of the '628 patent. Each of the gateways 119-121 may be any of a plurality of types of devices configured to perform the gateway functions defined herein, such as, for example, a general-purpose computer, a more specialized device such as an MYNXG® gateway or controller available from MyOmega and its MYXNG affiliates (e.g., MYNXG® i2, d3 or d3.1 models), any of variety of other devices, or any suitable combination of the foregoing.

Each gateway may include a security module (e.g., in a hardware layer of a controller described in the '628 patent), which may be used to perform any of a variety of data security operations, including encrypting portions of communications from/to monitoring devices to/from gateways, encrypting portions of such information received at a gateway unencrypted, or any of a variety of other functions described herein. For example, the gateway 120 may include a security module 125. The security module 125 may include a TPM or SE and/or other components, as described in more detail elsewhere herein. The security module 125 also may be employed for other data security operations used in various embodiments of the system described herein, including generating a one-way hash (or another type of hash) of a transaction record, or providing secure communications between components of the system 100, e.g., between the cloud 101, gateways, monitoring devices and/or end user devices. For example, the security module 125 and/or other components of the system 100 may be configured to implement Transport Layer Security (TLS) for HTTPS communications and/or Datagram Transport Layer Security (DTLS) for Constrained Application Protocol (CoAP) communications, e.g., as described in the '628 patent. Furthermore, one or more security credentials associated with any of the foregoing data security operations may be stored on the security module 125. Embodiments of security module 125 are described in more detail elsewhere herein.

Each of the gateways 119-121 may be configured to process thing status information received from one or more monitoring devices, which may include analyzing detected physical properties and other information that may have been generated or received by the monitoring device, and providing instructions to the monitoring device, as described in more detail elsewhere herein. For example, each of the gateways 119-121 may be configured with one or more thing management applications 122 encapsulating such capability. Furthermore, each of the gateways 119-121 may include one or more edge applications 132 that may provide additional functionality to that of the one or more thing management applications 122, where such additional functionality may be primarily directed to edge computing aspects of a gateway. It should be appreciated that certain thing management functions may be shared between one or more thing management applications 122 and edge applications 132. Each of the gateways 119-121 may include one or more array components (which may be referred to herein as thing management components) for implementing the one or more thing management applications 122, the one or more edge applications 132, or combinations thereof. The one or more thing management applications 122 and/or edge applications 132 may be configured to perform some or all of the analysis and/or control some or all of the actions described herein, for example, in implementing one or more defined states of a thing lifecycle. Each gateway may be configured to implement any of the network communication technologies described herein in relation to a monitoring device so that the gateway may remotely communicate with, monitor and manage monitoring devices.

Each of the monitoring devices 123, 124, 126 and 128 also may include one or more thing management applications 133, 134, 136 and 138, respectively, having some or all of the same capabilities of thing management application 122, and each of the monitoring devices 123, 124, 126 and 128 may include one or more components (which may be referred to herein as thing management components) for implementing the one or more thing management applications 133, 134, 136 and 138, respectively. By performing such processing at one or more gateways, and/or at the monitoring devices themselves, as opposed to in a more centralized fashion on one or more servers in the cloud 101, the system 100 may implement and enjoy the benefits of more distributed edge-computing techniques.

The user devices 140, 141 may be any of a plurality of devices (e.g., desktop computers, laptop computers, tablets, personal digital assistants (PDAs), cellular (e.g., smart) phones, other devices, or any suitable combination of the foregoing that enable a user to interact with other components (e.g., gateways, servers, monitoring devices) of the system 100. Each user device may be configured with any of the functionality described in the '628 patent with respect to the UEs 54, 55, 56 shown in FIG. 1 of the '628 patent, including any user equipment functionality described in relation to FIGS. 2 and 3 of the '628 patent. In some embodiments, one or more gateways may be configured with user device functionality and/or one or more user devices may be configured with gateway functionality. It should be appreciated that, while two user devices 140, 141 are shown in FIG. 1, the invention is not so limited, as hundreds, thousands, tens of thousands or even more user devices may be included in the system 100.

In some embodiments, each of one or more user devices (e.g., the user devices 140, 141) may include a security module having the same or similar capabilities as the security module 125 of gateway 120. For example, the user device 141 may include a security module 142, which may include a resident portion 142*a* that is a permanent part of the user device and a separate and discrete transitory portion 142*b*, which may be physically and/or wirelessly coupled and decoupled from the permanent portion. For example, the transitory portion 142*b* may be a dongle as described in more detail elsewhere herein. In some cases, all of the security functionality may be provided by the resident portion 142*a* so that the transitory portion 142*b* is not present. A TPM may be used and may be integrated inside the user device 142, or the TPM functionality may reside inside a chip (system on chip) or the TPM may be coupled temporary as a dongle or another device that is part of the transitory portion 142*b*.

Furthermore, one or more user devices (e.g., the user device 141) may include one or more visitor access apps (e.g., a visitor access app 147). Thing management applications or portions thereof that may be included in a user device are described in more detail elsewhere herein. In some embodiments, the visitor access app may consume approximately 1 MByte of non-volatile memory.

The performance and security of the system described herein, including monitoring devices, user devices, gateways and servers in the cloud 101, may be improved using security modules like the security module 125 for data security operations. A security module may be implemented within any of the gateways (e.g., MYNXG Edge devices provided by MyOmega Systems GmbH and the MYNXG affiliates), monitoring devices (e.g., MYNXG Sense devices provided by MyOmega Systems GmbH and the MYNXG affiliates), user devices or servers (e.g., MYNXG Transformation Layer/Flow and MYNXG Service Layer/Core provided by MyOmega Systems GmbH and the MYNXG affiliates) in the cloud 101, for example, during production, and may be used to personalize any such components. The security module 125 may be integrated into the thing 143 or the monitoring device 124, the security module 125 and the thing 143 may be integrated. Such gateways, user devices, monitoring devices and/or servers may be configured (e.g., during manufacture or later) to implement a Public Key Infrastructure (PKI) for the management of keys and credentials. Other cryptographic technologies may be used. Secure modules are described in more detail elsewhere herein.

The services layer 110 may provide one or more services, which may be consumed by applications in the transformation layer (which also may be referred to as an application layer) 102. The services may include services for managing things, including the data, mobility and security (e.g., access to) of things, and other services associated with things. For example, services may include transaction services 112, thing management services 116, mobile management services 118, other services corresponding to things, one or more databases and/or database management systems corresponding to any of the foregoing, and/or any suitable combination of the foregoing. The services layer 110 also may include a REST API that provides programmatic interoperability, including network communications, between the services layer 110 and other components of the thing management network 100, including a transformation layer 102, gateways, user devices, monitoring devices and other components of the system 100. The thing management services 116 may include data about things managed by the system 100. Any of the data included in any of the transaction services 112, thing management services 116 and mobile management services 118 may include information also stored in a monitoring device and/or user device. In some embodiments, the information corresponding to a thing may present such a complete state of the thing that is may be considered a virtual representation of the thing, e.g., a digital twin.

The transaction services 112 may include one or more transaction records, for example transaction blocks of a blockchain, involving things managed by the system 100. For example, the blockchain may serve as a secure transaction register for the system 100 or one or more defined subsystems thereof. Transactions may include smart contracts or any other commercial transaction involving one of the managed things, and also may include information, for example status information, relating to one or more things, that is not associated with a commercial transaction, as described in more detail elsewhere herein. Furthermore, the data stored within each of the other services, including the services 116, 118 within the services layer 110, may be stored as one or more transaction records (e.g., transaction blocks within a blockchain), and may be part of the transaction register for the thing management system 100 or one or more defined subsystems thereof. The services layer 110 may be implemented using one or more servers in the cloud 101.

The transformation layer 102 may be implemented using one or more servers. The transformation layer 102 may include one more applications, e.g., cloud- or web-based applications, that utilize information and services related to thing management, including any of the information and services made available from the services layer 110. For example, the transformation layer 102 may include any of: one or more visitor access management applications 104, one or more transaction data management applications 106; one or more safety management applications 108; an inventory application (not shown), an order management application (not shown), one or more other applications or any suitable combination of the foregoing.

The one or more visitor access management applications 104 may include one or more applications for managing a visitor's access to a site and to access and/or use one or more resources (e.g., places or things) as described in more detail elsewhere herein. For example, the applications may include applications configured to monitor a location of a user device of a visitor at or near a site (e.g., in a reception areas or at a security gate) via one or more communication technologies, for example, any of those described herein, including but not limited to GPS, WIFI, mobile telephony, NFC, BT and BT LE. The applications may be configured to enable and/or disable capabilities of user devices while on site, and to restore such capabilities to a user device when the user device leaves the site. The applications may be configured to communicate with and and/or control the user device while the visitor is on-site using such communication technologies, although in some embodiments one or more of these communication technologies may be disabled on the user device while on the site, in which case the disabled technologies would not be used. The applications may be configured to control access to places and/or things on the site via locking mechanisms and access codes, and to issue alerts when it is detected that the user is within a predefined proximity to a certain areas (e.g., a restricted or hazardous area) within the site. The foregoing functionality and other functionality that may be provided by visitor access management applications or other applications in the transformation layer that are described in more detail elsewhere herein.

The one or more safety management applications 108 may be configured to determine one or more aspects concerning the safety of things and places on a site, for example, whether a thing or place is hazardous and/or the extent to which is hazardous, e.g., a safety classification promulgated by one or more safety standards organization.

The one or more transaction data management applications 106 may be configured to provide access to any transaction data (e.g., smart contracts, thing status, visitor status) described herein, for example, within a secure transaction register. One or more of these applications also may be involved in processing (e.g., generating and storing) blockchain transaction records, and participating in blockchain communications with other components of the thing management network 100, as described in more detail herein. For example, one or more transaction data management applications 106 may be configured to participate in a streamlined blockchain communication sequence, as described in more detail elsewhere herein.

The inventory application may provide an inventory of things managed within the system (e.g., the system 100 or a defined subsystem thereof), including properties (e.g., characteristics) about each thing in the system and collective information about things in the system, including, for example: the current state of a thing (e.g., within a thing lifecycle as described in further detail herein), various numbers of things (e.g., number of things purchased, numbers of things in a particular state, number of things at a particular locations, etc.), physical properties of the thing (e.g., dimensions, weight), age of a thing, current location of a thing (e.g., one or more network identifiers for a mobile telephony network, Wi-Fi network, ISM network or other) and any other properties corresponding to a thing described herein. The inventory of things may be a group (e.g., "fleet") of things owned, leased, controlled, managed, and/or used by an entity, for example, a thing producer, OEM, transporter or consumer, another type of entity, or any suitable combination of the foregoing.

In some embodiments, the inventory application (or another application) may be configured to maintain an inventory of all visits by any person to any site managed by the thing management system 100. For example, as is described in more detail herein, each time person (for whom a person object as defined below has been defined on the thing management system), a record of the visit may be created and stored, for example, in an inventory database accessible by the inventory application. Each record may be a blockchain transaction record (e.g., a smart contract) as described in more detail elsewhere herein.

The order management application may manage thing orders of customers, for example, all customers of an entity, e.g., an OEM. The order management application may maintain information about all past and current thing orders for customers of an entity and process such orders. The order management application may be configured to automatically order things for an entity (e.g., a customer or OEM) based on thing status information received from monitoring devices physically coupled to things (e.g., via one or more gateways or directly from the monitoring device itself), or information received from a user device about the thing. For example, the order management application may have one or more predefined thresholds, e.g., of number of things currently in use, number of damaged things, etc., for which, upon being reached or surpassed, additional things should be ordered. It should be appreciated that the inventory application and the order management application are described for illustrative purposes, and the transformation layer 102 may include one or more other applications 108 of any of a variety of types, for example, a value-add and/or business application, related to the management of things. The one or more visitor access management applications 104, one or more transaction data management applications 106; one or more safety management applications 108; the inventory application, order management application and one or more other application may be configured (e.g., via one or more APIs or other interfaces) to interact with other applications within the transformation layer 102, including each other. The applications or portions thereof may be programmed into gateways, Web browsers, user devices and/or monitoring devices of the thing management network as well. One or more applications of the transformation layer 102 may be provided as all or part of a Web client browser app, as a hybrid of a Web client browser app and native device applications or as native device applications. The applications may reside, or be programmed or downloaded into gateways (e.g., the MYNXG Edge devices), monitoring devices (e.g., the MYNXG Sense devices) or user devices.

Figure 2:
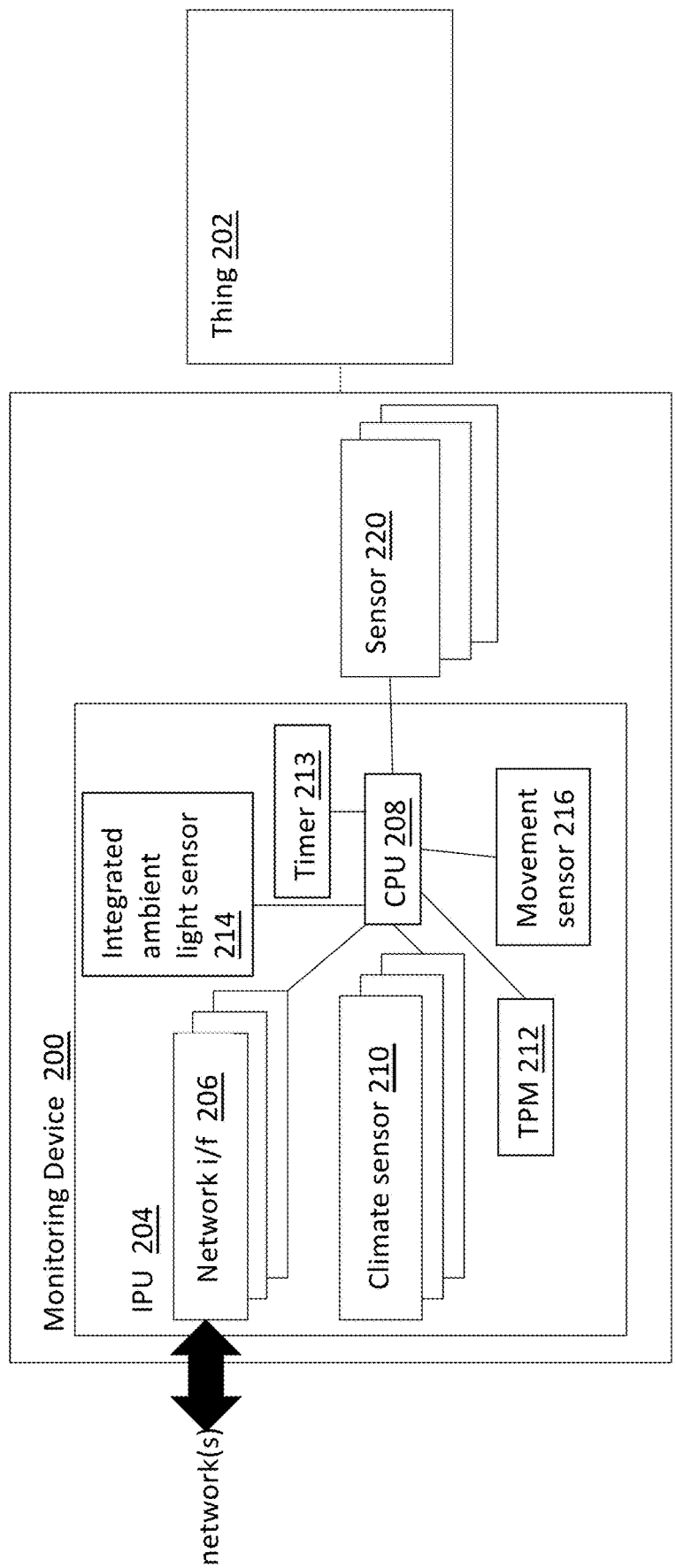
FIG. 2 is a block diagram illustrating a monitoring device coupled to a thing, according to embodiments of the system described herein.

FIG. 2 is a block diagram illustrating an example of a monitoring device 200 that may correspond, for example, to one or more of the monitoring devices 123, 124, 126, 128, coupled to a thing 202 according to embodiments of the system described herein. Other embodiments of monitoring devices, for example, variations of the monitoring device 200, are possible and are intended to fall within the scope of the invention. FIG. 2 may be considered a relatively high-level functional representation of a thing monitoring device according to embodiments of the system described herein. More physical aspects of embodiments of the monitoring device are described elsewhere herein. The thing 202 may be any type of thing. The monitoring device 200 may include any of: an IPU 204; one or more sensors 220; other components; or any suitable combination of the foregoing. Note that the IPU 204 and/or one or more other components of the monitoring device 200 may be configured to implement one or more thing management applications, and may collectively, or each individually, be considered a thing management component.

The IPU 204 may include any of: a CPU 208, one or more network interfaces (i/fs) 206, an integrated ambient light sensor 214, a movement sensor 216, one or more climate sensors 210, a TPM 212 and a timer component 213. The CPU 208 may be an ARM CPU or other type of CPU, and may be configured with one or more of the following: required processing capabilities and interfaces for the other components of the IPU 204 described herein, an ability to be interrupted by the timer component 213 and by the movement sensor 216, random access memory, and nonvolatile memory (e.g., FLASH) for storage. In some embodiments, the CPU 208 may be implemented using an STM32L4 96 VG CPU or a similar CPU made available by STMicroelectronics. The timer component 213 may provide a clock for the IPU 204, and to the CPU 208 specifically. The timer component 213 may be configured to provide the clock at any of a variety of frequencies, for example, at 32 KHz or lower. The frequency of the clock may be selected to balance a variety of factors, including, for example, cost, resource consumption (including power consumption) and highest desired frequency of operation.

The one or more network interfaces 206 may include a plurality of types of network interfaces, each interface configured to implement one or more particular technologies to enable communications with one or more types of networks. For example, the one or more network interfaces 206 may include one or more cellular communication interfaces enabling communications with cellular networks, and may be configured with technologies such as, for example, Long-term Evolution (LTE) and derivatives thereof like LTE narrowband (5G) and LTE FDD/TDD (4G), HSPA (UMTS, 3G), EDGE/GSM (2G) or CDMA technologies. Cellular communications may be used as one possible form of communication to enable a monitoring device to communicate with one or more other devices of a thing management network, such as systems described elsewhere herein, to perform any of a variety of functions. Such functions may include detection of geographic location of a thing (i.e., to which a monitoring device is affixed or otherwise coupled), including detecting a change in location from one cell of a cellular network to another cell, and a relative location of a thing within a cell, for example, a radial distance from the cell phone base station. The thing can be in any form, including an IBC, a pallet, a container, a tank, a c-level management container or fixed assets such as locks for pipes and doors within a cell, for example, a radial distance from the cell phone base station. The one or more cellular communication interfaces may be, include, or be part of a cellular modem.

The one or more network interfaces 206 may be configured to implement GPS technology, which in some embodiments may be integrated with cellular technology as part of a cellular modem. The network interfaces 206 also may be configured to implement UWB technology if accuracy of indoor location on the order of centimeters is desired, for example using one or more MYNXG® d3 (MYNXG EDGE FCR 3) modems available from MyOmega Systems GmbH and the MYNXG affiliates having offices in Nuremberg, Germany, (hereinafter "MyOmega"). Network interfaces 206 further may be configured to implement Wi-Fi technology, e.g., in accordance with one or more 802.11 standards, which may save communication cost. This cost savings may be more desirable for larger fleets of things, for example. The Wi-Fi technology may be used to connect with hotspots at various locations and during various states of a lifecycle of a thing, described in more detail elsewhere herein, and may serve as an option for establishing a communication path within a thing management network, for example, as an alternative, or in addition to a cellular communication path.

The one or more network interfaces 206 may be configured to implement Industrial, Scientific and Medical (ISM) band technology (also known as EU Sub 1 GHz Bands), e.g., 6LoWPAN, ZigBee, Lora and or Sigfox, to establish Wide Area Low Power links, having a range of, for example, 3000 meters, or perhaps more. In some embodiments, an ISM technology may be employed with 802.15.4 PHY, 6 LoW-PAN Layer 2 and MAC and CoAP protocol via ISM band.

The movement sensor 216 (e.g., an accelerometer) may be configured to detect and measure three-dimensional (e.g., relative to three axes) acceleration movement, and may use an optional gyroscope or artificial horizon, to detect the movement of the thing 202. That is, the movement sensor 216 may be configured to detect relatively abrupt movement, e.g., as a result of a sudden acceleration, in contrast to a more general change in geographic location. Such a movement may occur, e.g., as a result of a sudden stop, an accident, falling from a shelf, tipping over, being manually jostled, a hole in a road, a deformation of a railroad rail, wind turbulence impacting an airplane, stormy seas, etc. The movement sensor 216 may be used in combination with interrupt functionality of the CPU 208 to implement a deep sleep mode of operation, as described in more detail elsewhere herein.

The one or more climate sensors 210 may be configured to measure any of a variety of climate conditions of the monitoring device 200, e.g., inside a cavity of the monitoring device or inside a housing containing one or more components of the monitoring device, for example, the IPU 204 and/or one or more sensors 220. Such climate conditions may include any of: temperature, air humidity, air pressure, other climate conditions or any suitable combination thereof. While climate conditions may be measured inside a housing or cavity within the monitoring device, in some embodiments the monitoring device may include a pressure compensation membrane (e.g., a climate pressure equalization gasket), and measurement cycles may be ultra-short such that the measured climate conditions are valid for an environment in the immediate vicinity of (e.g., surrounding) the monitoring device as well. While the one or more climate sensors 210 are illustrated as being part of the IPU 204, one or more additional climate sensors may be external to the IPU 204, within the monitoring device 200 (e.g., as one or more sensors 220) or external thereto. Climate sensors located external to the IPU 204 may be linked through one or more M12.8 connector-based digital and/or analog interfaces, and may measure any of a variety of climate conditions, including but not limited to: temperature, humidity and pressure or other climate conditions of a thing, the contents or loads carried thereon (e.g., liquid, solid, air) and/or ambient air external to the thing.

The integrated ambient light sensor 214 may serve to ensure the integrity of a cavity, housing and/or electronics of the monitoring device, including providing mechanical dust and water detection. The sensor 214 may enable detection of evidence of tampering and potential damage, and thus provide damage control to protect electronics of the monitoring device 200.

The Trusted Platform Module (TPM) 212 may be used to encrypt data and to protect the integrity of the IPU 204. The TPM 212 may be used for any of a variety of functions such as, for example, creation of data for, and storage of credentials and secrets to secure, communication with one or more networks (e.g., any of the networks described herein); creation of TPM objects, which are special encrypted data stored in the nonvolatile memory outside the TPM, that can only be decrypted through the TPM; creation of data to be communicated and stored as part of transaction records (e.g., blockchain records) or registers, signing of files to secure the integrity and authenticity of services, e.g., services described herein; enablement of functions like Over-the-Air (OtA) update of firmware, software and parameters of the monitoring device 200; other functions; and any suitable combination of the foregoing.

The IPU 204 may include digital and/or analog interfaces, which may utilize an M12.8 connector to communicate with the one or more sensors 220. Such interfaces also may utilize I$^2$C busses as well. Such interfaces may include ModBus and or FieldComm Hart Bus and may use plug and play connectors of any kind of types, e.g., PCB terminal blocks and PCB connectors e.g., a Phoenix contact. The one or more sensors 220 may include any of the following: pressure sensors that are used to detect pressure imposed on the thing 202 (e.g., by a load of goods borne by the thing or liquid/solid contents of the thing); temperature array sensors to identify temperature profiles (e.g., the Melexis MLX 90621 Infrared sensor array made available from Melexis of Belgium, which provides 16×4 pixels); strain gauge sensors to identify forces imposed on a thing (e.g., by measuring the strain imposed by a load on the monitoring device affixed atop the thing, between the load and the thing), for example, to determine a weight of contents of a thing or a load borne by a thing; RFID readers to read signals transmitted by RFID tags/transponders on a thing or a load or contents (e.g., packaged goods) of a thing; optical code readers to read one- or two-dimensional bar codes (e.g., Quick Response Codes (QRCs) or the like) labeling a thing or contents or load of a thing; other types of sensors; or any suitable combination of the foregoing. For simplicity of reference, the term "RFID/QRC reader" or "reader" may be used herein to mean an RFID reader and/or an optical reader, which could be a QRC reader. That is, an RFID/QRC reader may include an RFID reader, a QRC reader, another type of optical code reader, or any combination of the foregoing. In some embodiments, the QRC/RFID labels on things and/or load items include a QRC code and/or serial numbers. In some embodiments, one or more RFID (UHF and NFC) readers may be implemented using an integrated circuit (IC) made available from NXP semiconductors, for example, the SLS3S4011_4021 model for RFID (UHF). The coding and communication of RFID/QRC information can be done in many forms, including, for example, using one or more of: ISO 18.000 part 6-compliant RFID tags; UHF EPC Global Generation-compliant communications; 2; GS1-compliant bar codes; and GS1-compliant QRC codes.

In some embodiments, the IPU 204 may be extended with RFID (NFC) technology that may be connected via I²C interfaces or any other interface to connect the one or more sensors 220 which might be an RFID (NFC) reader IC, for example, the NXP semiconductors PN7462 family, to provide access technology implementations. Such implementations may read and exchange data with NFC Access Cards like Mifare/Mifare DES and or exchange information with User Devices (User Equipment) like smartphones and use the smartphone based NFC technology for access purposes. In some embodiments, the IPU 204 may be configured to correct interference, for example, g-forces, caused by movement, and thereby avoid taking unnecessary action (e.g., waking up from an idle state, as described in more detail elsewhere herein).

The IPU 204 may be implemented using one or more software components, including an operating system of an MYNXG® TracoSense® sensor platform made available by MyOmega and the MYNXG affiliates, and the monitoring device 200 may be implemented as part of, or include a thing of, an MYNXG® TracoSense® IBC™ product made available from MyOmega and MYNXG affiliates, another type of monitoring device or another thing. The MYNXG® Edge and Sense Products and may contain the IPU 204 and may be provided by MyOmega and the MYNXG affiliates.

Although not illustrated in FIG. 2, the monitoring device 200 also may include one or more mobile phone vibrators or the like and microphones, which may be used, for example, for detection of damage to the thing 202 or monitoring device 200, and, in combination with logic (e.g., hardware, firmware or software) within the IPU 204, to determine a system health of the thing or monitoring device by analyzing resonances and frequencies of impact sound on the thing 202 using, for example, proprietary Detailed Sampling Mode (DSM) techniques available from MyOmega and the MYNXG affiliates or any other appropriate technique, including conventional techniques for analyzing resonances and frequencies of impact sound. For example, a microphone may be connected via digital/analog M12.8 connectors to the monitoring device 200 and/or integrated within the monitoring device 200 (e.g., within the IPU 204). Sound waves may be caused by acoustic stimulation of the thing, and DSM techniques may be employed to sample and analyze the sound waves.

Although not illustrated in FIG. 2, the monitoring device 200 also may include one or more cameras, which may be used to monitor and record the current load or contents of the thing 202, where such information may be used by image-processing logic, e.g., within the IPU 204 and/or a gateway, server or other elements of a thing management network described herein to control the loading or unloading of items onto/from the thing 202, and/or the filling or emptying of the thing. The monitoring device 200 may include, within the IPU 204 or otherwise, one or more batteries or accumulators, for example, a Lithium ion battery, and/or interfaces thereto. The monitoring device 200 also may include one or more interfaces that enable the battery or accumulator to be charged, and/or other interfaces, for example, one or more interfaces for display devices, e.g., an e-Paper interface.

One or more components of the monitoring device 200, including the IPU 204 and/or components thereof, may be implemented in hardware, firmware, software or a combination thereof, for example, on a printed circuit board (PCB). In such embodiments, the PCB may be affixed to one or more M12.8 connectors, for example, a male and female M12.8 connector. A battery or accumulator of the monitoring device 200 may be charged via an M12.8 connector, and external components may communicate with components of the monitoring device 200 via one or more M12.8 connectors as described elsewhere herein. The monitoring device 200 may include one or more antennas corresponding to the one or more communication technologies that may be included in the monitoring device 200 as described elsewhere herein. Each antenna may be integrated, if suitable, within a PCB in embodiments including a PCB, for example, in the IPU 204, or may be physically connected to the PCB and/or a housing thereof. For example, one or more antennas may be implemented as an integrated foil antenna, glued to the PCB or a housing of one or more components of the monitoring device 200.

Returning to FIG. 1, thing information may be communicated between components of the system 100, including monitoring devices, user devices, gateways and components of the cloud 101, in any of a variety of ways. Such techniques may involve the transmission of thing information in transaction records (e.g., blocks) of a blockchain or the like (e.g., using cryptographic techniques), and/or the storage of such records or information therein as part of blockchains or the like, for example, as part of a transaction register, as described in more detail elsewhere herein. Such transaction records may include public information and private information, where public information may be made more generally available to parties, and more sensitive information may be treated as private information made available more selectively, for example, only to certain thing producers, OEMs and/or particular customers. For example, the information in the transaction record may include private data that may be encrypted using a private key specific to a thing and/or monitoring device and may include public data that is not encrypted.

The public data also may be encrypted to protect the value of the data and to enable trading of the data, for example, as part of a smart contract. The distinction between public data and private data may be a matter of degree. For example, both public data and private data may be proprietary to a party, but the private data may be deemed more sensitive, e.g., more of a secret, and thus protected as such. For example, the public data may be basic specifications associated with a thing or a load or contents thereof, which a party is willing to share with any customer or potential customer, whereas the private data may be data the party is only willing to share with a technology or business partner, for example, for a payment or license fee. Accordingly, public data may not be encrypted at all, enabling any party given access to the transaction record access to the public data, or may be encrypted using a different credential (e.g., key) than the private data, so that a party may be more selective in enabling access to the private data; i.e., only give credentials associated with the private data to parties of certain contracts. Encrypted data, whether public or private, may be accessible only to those parties having a key corresponding to the private key, for example, the private key itself in a case in which symmetric cryptography is employed, or a corresponding asymmetric key in a case in which asymmetric cryptography is employed. In this manner, parties owning information corresponding to a thing, monitoring device or other device may make some portions of the information public and other portions private to only select parties, for example, according to a smart contract, as described in more detail elsewhere herein.

In some embodiments, information may be collected from one or more monitoring devices (e.g., the monitoring devices 124, 126, 128), for example, over a predetermined period of time, and may be grouped into a single secure transaction record. The secure transaction record may be sent from a gateway (e.g., one or more of gateways 119-121) to a server (e.g., residing within the cloud 101). Furthermore, in embodiments in which a monitoring device (e.g., the monitoring device 123) communicates directly with one or more servers in the cloud, the monitoring device itself may group information that the monitoring device has detected or determined over time about one or more things into a single secure transaction record that the monitoring device transmits to the server. In some embodiments, user devices (e.g., the user device 140 or the user device 141) may transmit one or more secure transaction records to gateways and/or directly to one or more servers in the cloud.

Each secure transaction record may include a one-way hash of, and a reference to (e.g., link or pointer), an immediately preceding secure transaction record for the overall system (e.g., network) for which information is being tracked. A hash of a secure transaction record is an output of a mathematical function, algorithm or transformation (hereinafter "hash function") applied to the secure transaction record. The hash function may be configured to produce a hash value that can be represented by a data structure (e.g., a string) of uniform size or range of sizes. In some embodiments of the system described herein, the hash is a one-way hash in that the hash function that produced the hash value is infeasible to invert (e.g., a cryptographic hash function). By including the one-way hash as part of the next (i.e., current) secure transaction record, it can be determined if an immediately preceding record has been altered by determining if the one-way hash generated from the altered secure transaction matches what is stored in the next transaction in the chain.

Furthermore, in embodiments of the system described herein, each secure transaction record includes a one-way hash of, and a reference (e.g., link or pointer) to an immediately preceding secure transaction record, forming a continuingly growing temporal list of records referred to herein as a record chain (e.g., a blockchain). Altering any secure transaction record in the record chain will have a cascading effect of changing the expected one-way hash of every future secure transaction record, such that the source altered record can be determined. Thus, using a one-way hash function (or mathematical asymmetric hash function) enables, along with other features described herein, reliable tracking of thing information in a system. Any of a variety of cryptographic one-way hash functions may be used, for example, MD4, MD5, SHA-1 and SHA-2.

In some embodiments, a record chain may be implemented using a blockchain, each secure transaction record of the record chain being implemented using a transaction block of the blockchain (also known as a block-chain or block chain). A blockchain is a continuously growing list of records, called blocks, which are linked and secured using cryptography. Each block contains transaction data or information and may contain a hash pointer as a link to a previous block (i.e., an immediately preceding block in the chain), and a time stamp. By design, blockchains are inherently resistant to modification of the data. Blockchains may be considered an open, distributed ledger that can record transactions between two parties efficiently and in a verifiable and permanent way. For use as a distributed ledger, a blockchain may be managed by a peer-to-peer network collectively adhering to a protocol for validating new blocks. Once recorded, the data in any given block cannot be altered retroactively without the alteration of all subsequent blocks, which requires collusion of a network majority. Blockchains are considered secure by design and may be considered an example of a distributed computing system with high Byzantine fault tolerance.

Although various embodiments of the system described herein use blockchains, the invention is not so limited. Other appropriate technologies may be employed to record transactions herein or to implement a record chain, where such technologies are inherently resistant to modification of the data and can record data in a verifiable and permanent way that preserves temporal relationships between the data blocks so that, for example, deletion/removal/modification of any block(s) in the chain may be detected. Once the data is recorded in any block, such data cannot be altered retroactively without the alteration of all subsequent blocks in the block-chain.

It may be desirable to engage in commercial transactions involving things, for example, purchases, leases, licenses and other types of transactions, and blockchains may be used as part of contractual transaction between transacting parties. For example, the purchase or lease may include the seller providing the buyer access to and/or control of a transaction register of one or more things; e.g., in the form of a blockchain. Going forward from the time of the transaction, the buyer may continue to grow the blockchain, and at later date provide access to or control of the blockchain to a future buyer or other transacting party. In some embodiments, the contractual transaction itself is implemented using blockchains or the like. That is, a blockchain may be used to implement a "smart contract" between parties, for example, by defining the rules (i.e., terms) of the contract (including payment terms, access to information, timing, etc.), enforcing the rules of the contract, and recording the execution of the contract and/or transactions under the contract as transaction blocks of a blockchain. For example, a blockchain may define a license scheme (e.g., one-time fee, installment payments, pay-per-use, etc.) involving a fleet of things or subcomponents (e.g., parts) thereof as described herein, and record transactions under such a contract as transaction blocks of a blockchain. In some cases, the smart contract may define the rules for the exchange of information related to a fleet of things or parts thereof, or a subset thereof.

Such smart contracts may define rules governing the exchange of public and private data/information as described herein and record the results of a transaction in relation to the same. For example, a smart contract may define the rules by which a first party, e.g., a customer, is allowed access to public or private information of an OEM, e.g., the proprietary specification for a thing, user device, monitoring device or combination thereof, in exchange for public or private information of the customer for the thing, user device, monitoring device or combination thereof, or perhaps in exchange for currency, e.g., bitcoins, or another asset. Proprietary information may include, for example, internal designs, proprietary interfaces, benchmarking results, other test data, manufacturing reliability data, customer lists, price lists, source code, etc. A smart contract may be defined to provide a party to the contract one or more keys (e.g., a private and/or public encryption keys) or other credential(s) that provides access to encrypted public or private information, for example, in response to a payment made by the party, performance of an action, or in exchange for some other form of consideration. The use of smart contracts may be applied to the management of a thing lifecycles as described herein and commercial transactions in relation thereto.

Components of the system 100 may be configured to reduce (e.g., minimize) the number of communications therebetween, which in some embodiments may include communicating transactions (e.g., thing status information) to servers within the cloud 101 according to a predefined schedule, in which gateways are allotted slots within a temporal cycle during which to transmit transactions (e.g., report thing status information) to one or more servers. Each transaction transmitted from a gateway to a server may include thing information received from one more monitoring devices and/or user device in one or more communications (e.g., status reports) sent from the monitoring devices and/or user devices since a last such transaction was sent to the server, and may in some embodiments include only changes to information since a last transaction. Thing information may be collected, stored and managed in a computationally efficient and secure manner that ensures the integrity of the thing to a high degree of certainty.

Figure 3A:
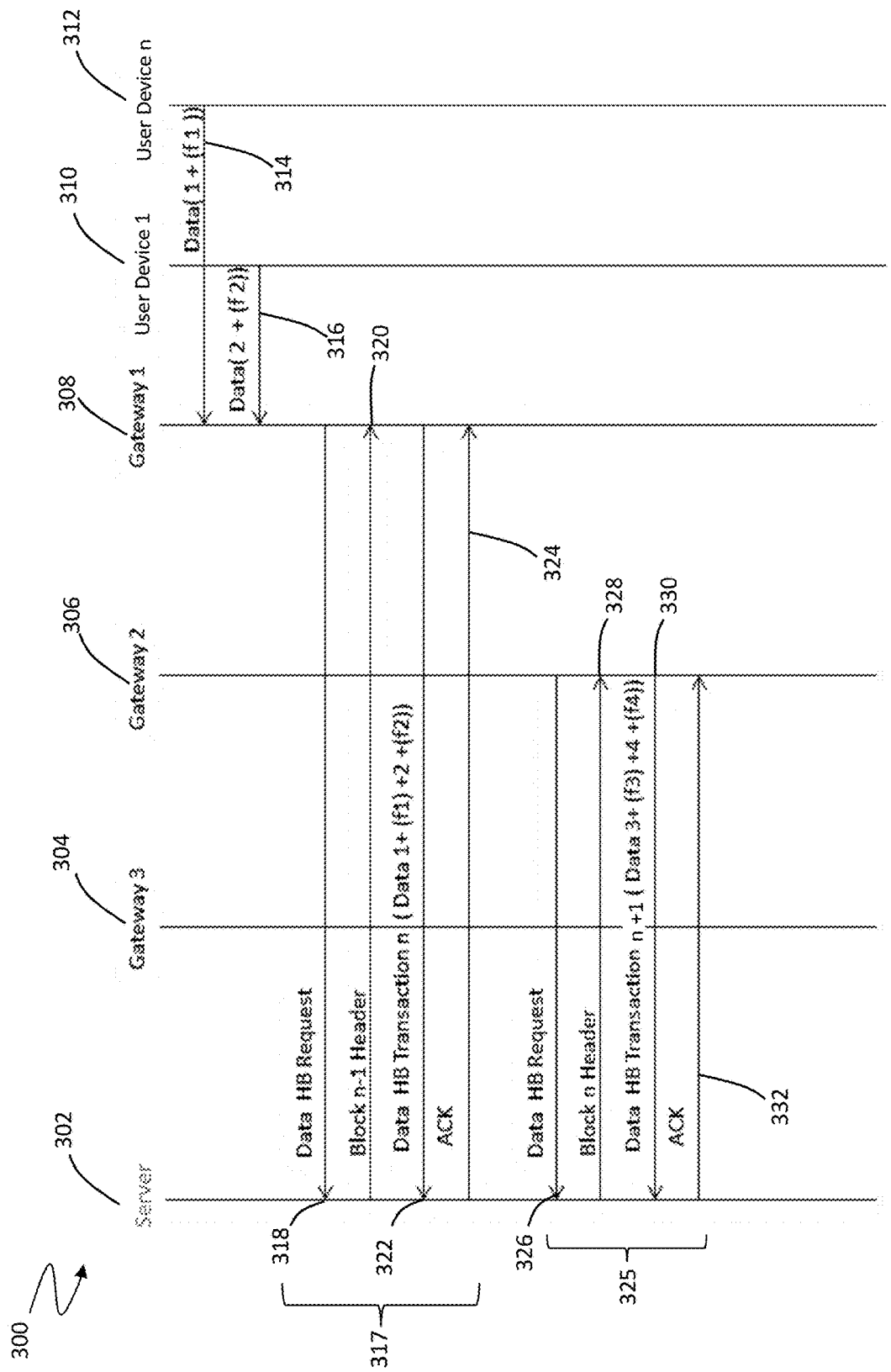
FIG. 3A is a diagram illustrating a sequence of communications between user devices, gateways and a server (e.g., of a network cloud) to efficiently and reliably track device information on a network, according to embodiments of the system described herein.

FIG. 3A is a sequence diagram illustrating a sequence 300 of communications between user devices 310, 312 (e.g., the user device 141), gateways 304, 306, 308 (e.g., the gateway 120) and a server 302 (e.g., of a network cloud 101) to efficiently and reliably track device information on a network according to embodiments of the system described herein. Other embodiments of a sequence of communications between user devices, gateways and a network cloud to efficiently and reliably tracking device information on a network, for example, variations of the sequence 300, are possible and are intended to fall within the scope of the invention. The sequence 300 may be implemented using components of the system described herein, including, for example, components of the thing management network 100 and a security module, such as a security module 400, described in more detail elsewhere herein. Although the sequence 300 is illustrated with communications between gateways and user devices, it should be appreciated that, in some embodiments, the same or similar communications may be made between one or more monitoring devices (e.g., the monitoring device 124) and a gateway.

A communication 314, including public data "1" and private data "(f1)" may be transmitted from the user device 312 to the gateway 310, and then a communication 316, including public data "2" and private data "(f2)" may transmitted from the user device 310 to the gateway 308. At some later point in time, for example during an allotted time slot, the gateway 308 may transmit a transaction transmission request 318, e.g., a Data Heartbeat (Data HB) Request to the server 302. In response, the server 302 may send a one-way hash 320 of an immediately preceding transaction record, n−1, e.g., from a header of a transaction block n−1, to the gateway 308. The gateway 308 then may send a transaction record 322, e.g., Data HB transaction n, including the public and private information from the communications 314, 316, and the server 302 may respond with an acknowledgment (ACK) 324. The gateway 306 then may transmit a transaction transmission request 326, e.g., a Data HB Request to the server 302, for example, during an allotted time slot for the gateway 306. In response, the server 302 may send a one-way hash 328 of an immediately preceding transaction record, n (i.e., transaction record 322), e.g., from a header of a transaction block n, to the gateway 306. The gateway 306 then may send a transaction record 330, e.g., Data HB transaction n+1, including public information "3" and "4" and private information "(f3)" and "(f4)" received, for example, in communications from one or more user devices coupled to the gateway 306, and the server 302 may respond with an acknowledgment (ACK) 332.

It should be appreciated that the sequence 300 includes two sub-sequences of communications between a gateway and a server including a sequence 317, which includes four communications 318, 320, 322, 324, and a sequence 325, which includes four communications 326, 328, 330, 332. A streamlined blockchain communication sequence makes efficient use of network resources and may be considered to create a minimum amount of communication overhead necessary to properly implement a transaction chain (e.g., blockchain). In alternative embodiments, every gateway may receive a blockchain update every time a gateway submits a transaction record to the server. In contrast, using the streamlined blockchain communication sequence, a gateway only received an update to the blockchain in response to making a data heartbeat request (e.g., the request 318 or the request 326), thus making more efficient use of network resources. Considering that the device information of the transaction record may be transmitted, and an acknowledgement received, in any scheme in which transaction information is recorded, the only additional communication overhead included in a streamlined blockchain communication sequence is the sending of the transaction transmission request, the receipt of the one-way hash of the previous transaction, and the inclusion of the one-way hash of the transaction in the transaction record. That is, for n transactions between gateways and a server of a system, the message overhead (compared to a system not using a transaction chain) is only 2*n messages.

For example, assume a thing management system in which 30 user devices and/or monitoring report transactions through a given gateway, 12 bytes of information are produced per monitoring device or user device, a one-way hash of a transaction has a length of 256 bits (32 bytes), and a communication header for any transaction communication has a length of 64 bytes. With these assumptions, the number of bytes consumed for each submission of a transaction record from a gateway, and the communication overhead associated therewith, may be calculated as follows:

Transaction transmission request=communication header=64 Bytes

Response from server=communication header+one-way hash=64+32=96 Bytes

Transaction record=communication header+one-way hash+device information=64+32+12*30=456 Bytes.

ACK message=communication header=64 Byte.

Total transaction record bytes=64+96+456+64=680 Bytes

Total transaction record overhead=transaction transmission request+response from server+one-way hash of the transaction record=192 Bytes, which is approximately 25% of the total transaction record bytes.

The percentage of overhead reduces as a number of user devices and/or monitoring devices reporting to a gateway grows. For example, if there are 500 monitoring devices and/or user devices, the overhead percentage may be smaller than 3%.

Although the streamlined blockchain communication sequence is described in relation to communications between a gateway and a server, it should be appreciated that the invention is not so limited. The streamlined blockchain communication sequence may be used to communicate transaction records between any two components of a thing management network, including any of the communications described herein. It should further be appreciated that, in some embodiments, a user device and/or monitoring device may communicate directly with a server without use of a gateway, and in such embodiments the user device or monitoring device may communication information to one or more servers using the streamlined blockchain communication sequence.

In some embodiments, the monitoring device 123 may initiate the sequence 300 directly with the cloud 101. In such cases, the monitoring device 123 contains a security module 125. In some instances, the monitoring device 123 is designed according to FIG. 2 (discussed elsewhere herein) and the sensor 220 is an RFID NFC reader. Such an embodiment could serve as access control solution and create Blockchain transactions in case a person would enter/leave a physical area controlled by the described monitoring device.

Figure 3B:
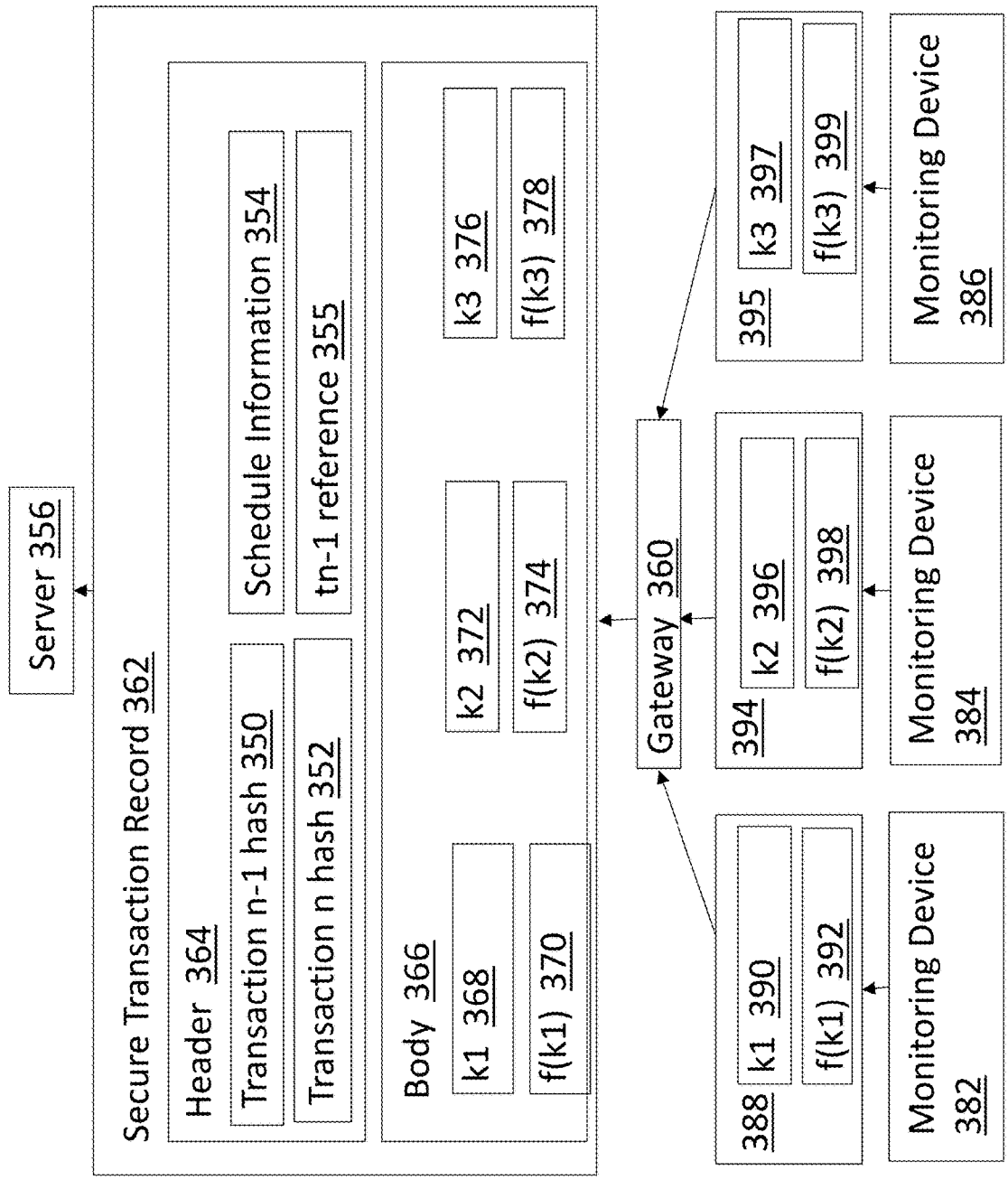
FIG. 3B is a block diagram illustrating using a secure transaction record to communicate and store thing-related information on a thing management network, according to embodiments of the system described herein.

FIG. 3B is a block diagram illustrating an example of using a secure transaction record 362, for example, a transaction block of a blockchain, to communicate and store thing-related information on a thing management network according to embodiments of the system described herein. Other secure transaction record formats, for example, variations of the secure transaction record 362, are possible and are intended to fall within the scope of the system described herein. While the illustrative embodiment of FIG. 3B describes communicating secure transaction records between monitoring devices and gateways, or directly from monitoring devices to servers, it should be appreciated that the invention is not so limited. Secure transaction records, as described in relation to FIG. 3B and elsewhere herein, also may be communicated between user devices (e.g., the user device 141) and gateways or directly from user devices (e.g., the user device 140) to a server.

A plurality of monitoring devices 382, 384, 386 (e.g., any of the monitoring devices 123, 124, 126, 128) may send (e.g., transmit) communications 388, 394, 395, respectively, to a gateway 360 (e.g., one of the gateways 119-121) concurrently or at different times, for example, in accordance with a predefined schedule, in response to an event (e.g., a determined change in property and/or state of a thing) or in response to user input (e.g., a data request). Each of the communications 388, 394, 395 may include public information elements 390, 396, 397, respectively, and private information elements 392, 398, 399, respectively, described in more detail elsewhere herein. It should be appreciated that one or more (e.g., all) of the communications received from the gateway 360 may have been transmitted by one or more user devices (e.g., the user device 141) in accordance with a predefined schedule, in response to an event or in response to user input The gateway 360 may generate a secure transaction record 362 and may send the secure transaction record 362 to a server 356 (e.g., in the cloud 101). The secure transaction record 362 may include a transaction header 364 and a transaction body 366. The transaction body 366 may include public information elements 368, 372, 376 corresponding to the public information elements 390, 396, 397, respectively, and private information elements 370, 374, 378 corresponding to the private information elements 392, 398, 399, respectively.

The transaction header 362 may include a one-way hash 350 of an immediately preceding secure transaction record, $t_{n-1}$, a reference (e.g., link or pointer) 355 to the immediately preceding secure transaction record, $t_{n-1}$, a one-way hash 352 of a current secure transaction record, $t_n$, and schedule information 354. The one-way hash of $t_{n-1}$ may have been obtained from the server 356 in response to a request, or, in another embodiment, in an update from the server 356 in response to submission of another secure transaction record to the server 356. In some embodiments, information included in the record transaction body 366 may include only information corresponding to a thing that has changed since a last transaction. In some embodiments, information unchanged since a last transaction is included in the transaction record body 366, and there is a mechanism for indicating which information has changed. The transmission of secure transaction records from gateways to a server (or directly from a monitoring device to a server) may be scheduled using predetermined time slots within a cycle. The transmission schedule may be defined, stored and/or under control of the server to which record transactions are transmitted, and may be implemented using any of a variety of technologies, including a cloud-based scheduler. The schedule information 354 may specify the predetermined time slot within a cycle for transmission of the secure transaction record 362 to one or more servers in the cloud 101.

The secure transaction records transmitted from gateways to servers (e.g., the secure transaction record 362) may be stored on the server as part of a transaction chain for the gateway, i.e., a transaction chain corresponding to a thing management system associated with (e.g., specific to) the gateway. The server (e.g., the server 356) also may store the transaction record as part of a transaction chain corresponding to a thing management system at the server/cloud level, for example, for which thing management systems at the gateway level are subsystems. For example, one or more servers in the cloud 101 may store a transaction chain that includes transaction records corresponding to the gateways 119-121, as well as transaction chains corresponding to monitoring devices (e.g., the monitoring device 123) directly connected to one or more servers in the cloud 101 or user devices. While FIG. 3B has been described primarily in relation to communicating information from monitoring devices through gateways to servers in the cloud, it should be appreciated that the invention is not so limited. In some embodiments of the system described herein, a monitoring device (e.g., the monitoring device 923) may collect thing information over time and transmit a secure transaction record like that described herein directly to one or more servers in the cloud without use of a gateway.

Figure 4:
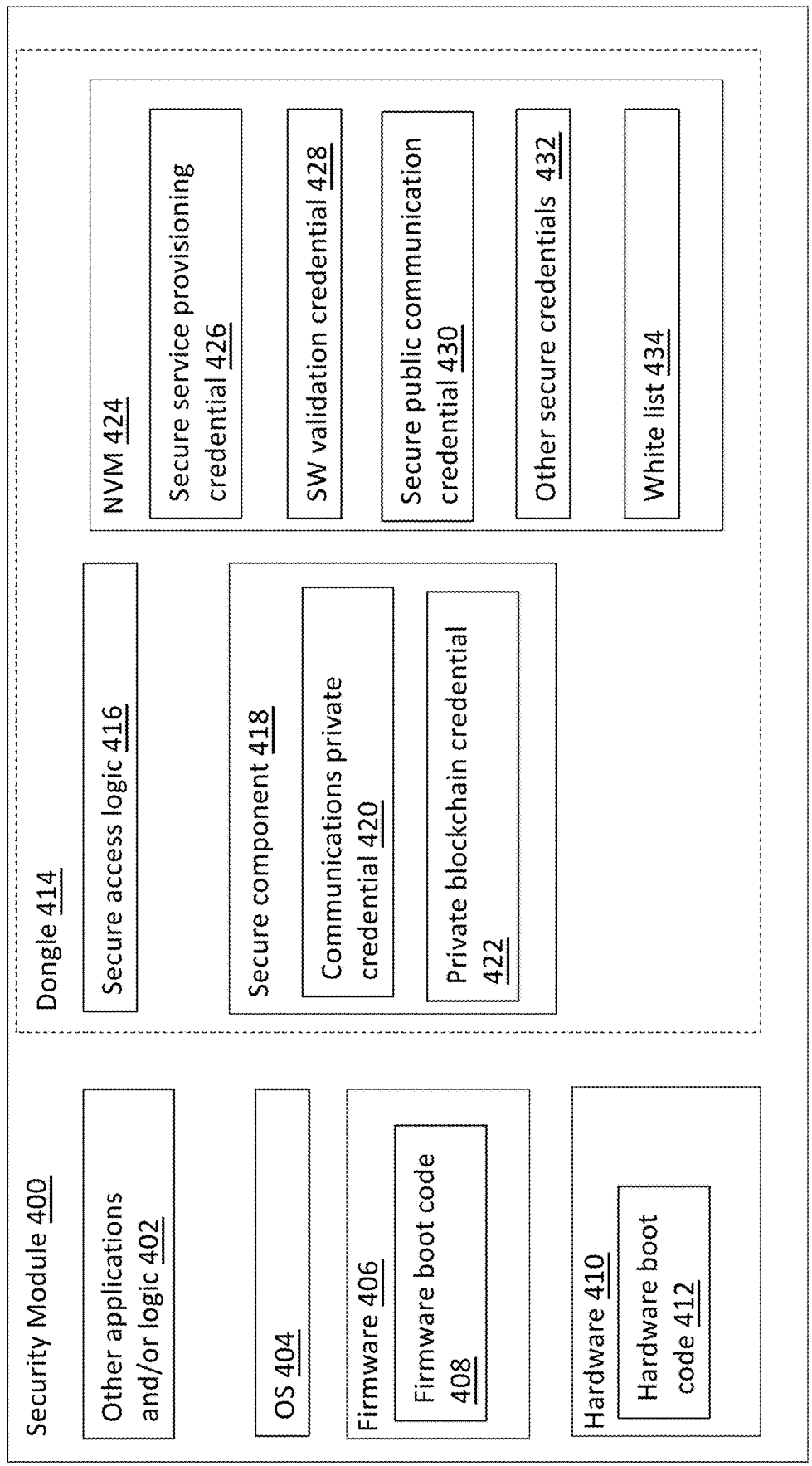
FIG. 4 is a block diagram illustrating a security module of a device, according to embodiments of the system described herein.

FIG. 4 is a block diagram illustrating an example of the security module 400 of a device, for example, a gateway or user device, according to embodiments of the system described herein. Other security modules, for example, variations of the security module 400, are possible and are intended to fall within the scope of the invention. In some embodiments, the security module 400 may implement one or more TPM-based security functions and/or blockchain related functions. The security module may include any of: hardware 410, firmware 406, operating system (OS) 404, secure access logic 416, secure component 418, non-volatile memory 424; other applications and/or logic 402, other components, or any suitable combination of the foregoing. The security module 400 may implement a root of trust (RoT), serving as a trusted computing base (TCB), including providing hardware- and firmware-based security including cryptography for the device (e.g., gateway, user device or monitoring device) in which the RoT is embedded. The security module 400 may provide compute resources that are dedicated exclusively for such security and may be physically secure against access by external components and processes.

In some embodiments, a root of trust may be implemented by the security module 400 as follows: The hardware 410 may include hardware boot code (e.g., Intel Atom-based hardware start-up code) 412, which, when triggered, may implement a ROM-based boot sequence. This sequence may verify (e.g., using a boot partition key pair) the firmware (FW) boot code (e.g., including external firmware interface (EFI) code inside the basic input-out system (BIOS) of the firmware 406. After being verified, the FW boot code then may verify software modules within the OS 404, for example, kernel and kernel objects of the OS 404, e.g., an Android OS. After being verified, the OS 404 may call the secure component 418, which may be (or include) a TPM and/or SE, for example, a TPM or SE as described in more detail herein. The secure component 418 may be implemented using hardware and firmware, and in some cases may include software.

The secure component 418 may be configured to validate the secure access logic 416, which may be implemented in software, firmware and/or hardware. In some embodiments, the secure access logic 416 may be, or may include, the MYNXG® Cipher Suite™ made available from MyOmega and/or MYNXG affiliates. Validating the secure access logic 416 may include use of one or more private credentials, for example, a private communication credential 420 and a private blockchain credential 422, each of which may be a cryptographic key (e.g., having a length of 256 bytes), for example, stored within the secure element 418.

In an embodiment herein, the private communication credential 420 and the private blockchain credential 422 are embedded in the security module 400 at the time of manufacture and are never transmitted outside of the security module 400. In some embodiments, one or both of the private communication credential 420 and the private blockchain credential 422 are generated inside the cloud 101 using, for example, an HSM in the cloud 101. The private communication credential 420 may then be used to digitally sign data from the device in which the communication module is embedded using a corresponding public key. The private communication credential 420 may also be used to provide derived keys and to initiate a symmetric key exchange to facilitate encrypted communication between the device in which the security device 400 is stored and another device. In some embodiments, the private communication credential 420 is used in connection with elliptic curve mutual authentication. The private blockchain credential 422 may be used for creating and verifying the blockchain hash values.

The private communication credential 420 may also be used to provide derived keys and/or to validate further keys stored as TPM objects to generate derived keys for secure communications between components (e.g., gateways, user devices, monitoring devices, servers) of a thing management network, for example, as described in relation to FIG. 1 and FIG. 3 (e.g., in accordance with TLS). The private blockchain credential 422 also may be used to implement secure transaction records, for example, as described in more detail elsewhere herein, e.g., in relation to FIG. 1 and FIG. 3. The secure element 418 may be configured to protect against any possibility of reading data therefrom when locked. Such locking may occur as a last step of producing (i.e., manufacturing) the secure element 418. The secure component 418 may be certified by the Bundesamt für Sicherheit in der Informations Technik (BSI) and may provide Common Criteria (CC) Evaluation Assurance Level 5; i.e., CC_EAL level 5 security.

Validating the secure access logic 416 also may include utilizing one or more secure credentials (e.g., secrets), which may be stored in encrypted form in the NVM (e.g., flash) 424, and may include a secure service provisioning credential 426, a SW application validation credential 428, a secure public communication credential 430 and perhaps other secure credentials 434. The SW Public Validation Credential 428 may be exchanged via secure communication channels and may also be created/stored for dedicated apps because the SW Public Validation Credential 428 is the public element of a key pair. Initial firmware boot code 408 may be initially provided to the security module during manufacture inside a secure production environment. The initial firmware boot code 408 ensures that an initial boot of the system is secure. Subsequent versions of the boot code 408 may rely on the initial version as a basis for validation. Secure credentials may be stored as TPM objects encrypted with TPM object keys, which may have been generated via random generators and hardware inside the secure component 418 during production and may be stored in the secure component 418. The secure service provisioning credential 426 also may be used for service provisioning on a gateway, monitoring device, user device or other device of a thing management network. The secure public communication credential 430 also may be used as a public credential (e.g., key) of a secure communication link (e.g., per TLS) between one or more components of a thing management network.

The secure access logic 416, after itself being validated, may use a SW public validation credential 428 (utilizing the implemented root of trust based on the production methods (initial boot) and the credentials stored inside the secure component) to validate signatures of one or more software modules on a device, including, for example, one or more modules of the OS 404 (e.g., a virtual machine (VM) and/or activity manager thereof), the binary code of the secure access logic 416, the binary code of loadable user space modules of the OS 404, the binary code of one or more other applications and/or logic 402, a client portion of a visitor access management application (e.g., the visitor access app 147) and other software modules. For example, the SW public validation credential may be used to validate a digital signature of one or more of the foregoing software modules. The SW modules may be signed by private keys within a secure part of the cloud 101, which may have been generated using a credential (e.g., key) that together with the SW public validation credential 428 constitute a credential pair (e.g., key pair) of a cryptography scheme. For example, one or more of the software modules may have been produced by MyOmega and MYNXG affiliates and signed according to the MYNXG Public Key Infrastructure made available by MyOmega, e.g., in a highly secure environment in accordance with an ISO 27.001 certified set of rules of the MYNXG Public Key Infrastructure. The digital signature(s) generated by the producer for one or more software modules may be included in the one or more software modules and accessed by the secure access logic 416 to perform the verification.

The secure access logic 416 also may use the SW public validation credential 428 (e.g., as part of implementing a root of trust) to determine whether one or more software modules (e.g., any of those described above in relation to verifying signatures) installed on a device (e.g., a gateway, user device, or monitoring device) are members of a white list of software modules (e.g., applications and other types of software modules) that are permitted to be installed on the device. For example, the producer of the device may store an encrypted list of permitted software modules, the white list 434, within NVM 424. The secure access logic 416 may be configured to determine whether one or more (e.g., all) software modules on the device are also included on the white list 434, for example, by decrypting the white list 434 using the SW public validation credential 428, and comparing the name (or other identifier) of the software module to the decrypted names or other identifiers of the software modules included in the whitelist 434. One or more other secure credentials 432 may be included in the NVM 424 and used as part of validating one or more software modules or performing one or more other security-related functions.

In some embodiments, one or more components of the security module 400, for example, the secure access logic 416, the secure HW component 418 and/or the NVM 424, and/or sub-components thereof, may be implemented as part of a dongle 414, e.g., a relatively small, portable piece of computer hardware connectable to (e.g., a port of) a user device, gateway or other component of a thing management network. Use of the dongle 414 or the like may be desirable on a user device, for example, if the user device is produced by a different entity (e.g., Apple, Samsung) than the entity (e.g., MyOmega and MYNXG Affiliates) that provides one or more of the security components described herein.

The dongle 414 may be configured with one or more communication interfaces to enable physical and/or wireless interconnection with a remainder of the security module 400 and a device on which the security module 400 resides, e.g., a smart phone or other type of user device. For example, the dongle 414 may be configured with a USB port and/or NFC, BT, BT LE or other technologies that enable such communications. The dongle 414 may be locally coupled to the user device for which the dongle 414 will be used, the user device including the remainder of the security module components. For example, in some embodiments, the dongle 414 may be, or may include, the transitory portion 142b of the security module 142 of the user device 141.

In some embodiments, functionality of the dongle 414 and in particular the secure component 418 are integrated within one of the user devices 141, 140 and the functionality described may reside as an integrated part of the devices 141, 140. The software services provided by the security module 400 may then be implemented as part of the firmware, operating system, application framework and/or application software of the user device. In some embodiments, the dongle 414 may be implemented by utilizing the monitoring device 123 that is designed according to FIG. 2 and may contain an RFID NFC reader that is used as the sensor 220. Such an embodiment could interact with one or more of the user devices 140, 141 via the RFID NFC that is integrated therein and could be used for verification by the visitor access app 147 therein. A deployment of such an embodiment could include an access terminal at a reception area where the visitor access app 147 is validated before access is granted. Generally, the security functionality and the secure component 418 are either proximal to one of the user devices 140, 141 when the security functionality and the secure component 418 are provided in the dongle 414 coupled to the user devices 140, 141 or provided internally to the user devices 140, 141.

In some embodiments of the system described herein, a data model for managing things in a thing management network may be provided. The data model may include a plurality of object types and attribute types that may be used to design and represent objects for managing things in a thing management network. An object may be considered an instance of an object type, and may be defined by an ID (e.g., name) and one or more constituent objects and attributes. The constituent objects and attributes enable a user to associate information defined by the objects and attributes to the object of which the objects and attributes are a member. An attribute may be considered an instance of an attribute type, and be defined by an ID (e.g., name) and a value for the attribute type.

It should be appreciated that the security module 400 may build upon or extend existing security platforms. For example, in some embodiments, the security module 400 may include one or more components (e.g., of the OS 404, firmware 406 and/or hardware 410) implementing Apple iOS, Android and/or Samsung Knox technology, the functionality of which may be extended or enhanced by the functionality described herein.

FIG. 5A is a block diagram illustrating an example of a data object 502 for managing things in a thing management network, according to embodiments of the system described herein. Other data objects (often referred to herein as simply "objects") for managing things in a thing management network, for example, variations of the data object 502, are possible and are intended to fall within the scope of the system described herein. It should be appreciated that any number of the data objects 502 may be defined and used to managing things in a thing management network. The data objects 502 may include any of: attributes 504, 506, 508, an other object 510, and one or more additional other objects and/or attributes. The object 510 may include an attribute 512, an other object 514, and one or more other objects and/or attributes. Similarly, the object 514 may include attributes 516, 518 and one or more other objects and/or attributes.

FIG. 5B is a block diagram illustrating an example of a data structure 524 of a data object (e.g., the data object 502) for managing things in a thing management network, according to embodiments of the system described herein. Other data structures of a data object for managing things in a thing management network, for example, variations of the data structure 524, are possible and are intended to fall within the scope of the system described herein.

It should be appreciated that the various embodiments of a data model described herein, including one or more data objects (e.g., the data object 502 and other objects defined herein) may be shared and used among multiple entities (e.g. companies), as opposed to being exclusive (e.g., proprietary) to a single entity. As described herein, blockchain technology may be used to ensure the integrity of data objects shared among multiple entities. For example, blockchain technology may be used to implement one or more data objects (e.g., for managing things in a thing management network) as a secure transaction register and/or distributed ledger.

The data structure 524 may be for an object 522, which may correspond to the object 502. The object 522 may include and be defined by an object ID (e.g., name) 522a and an object type value 522b, which may be a value representing any of the object types described herein. The object 522 may include and be defined by attributes 524, 526, 528, which may correspond to the attributes 504, 506, 508, respectively. The attributes 524, 526, 528 may include and be defined by attribute IDs 524a, 526a, 528a, respectively, and attribute values 524b, 526b, 528b, respectively. The object 522 also may include and be defined by an object 530 (e.g., the object 510), which may be defined by: an object ID 530a and an object type value 530b (which may be a value representing any of the object types described herein), an attribute 532 (e.g., the attribute 512), and an object 534 (e.g., the object 514). The attribute 532 may include and be defined by an attribute ID 532a and an attribute value 532b. The object 534 may include and be defined by an object ID 534a and an object type value 534b (which may be a value representing any of the object types described herein), an attribute 536 (e.g., the attribute 516), and an attribute 538 (e.g., the attribute 518). The attribute 536 may include and be defined by an attribute ID 536a and an attribute value 536b, and the attribute 538 may include and be defined by an attribute ID 538a and an attribute value 538b.

Types of objects may include: a product, a company, a site, a thing, a system, a rule, a process and a person. In some embodiments, other types of objects may be defined. A product object type represents a product, which may be a physical product (e.g., a package of goods), a virtual product (e.g., software application) or even a service (e.g., delivery service). A company object type may represent a business entity (e.g., a legal entity), which may serve in different roles (e.g., OEM, supplier, consumer, etc.) in different contexts, which may be reflected in values of attributes defined for the company. A site object type may be used to define and represent a physical place defined by a geographical location (i.e., area). A thing object type may be used to define and represent any thing that may be managed by a thing management network, including any type of thing described herein.

A system object type may be used to define and represent a system with the ability to maintain records such as, for example: a traditional enterprise resource planning (ERP) system to manage financial information and other information of a company, e.g., an ERP system made available from SAP or Oracle; a customer relationship management (CRM) system, e.g., a CRM system made available from salesforce.com; a produce lifecycle management (PLM) system and/or energy management system (EMS) to control production and manufacturing processes, e.g., those made available from Siemens; or any suitable combination of the foregoing. In some embodiments of a data model as described herein, the data model may be configured to enable interfacing with one or more such systems; i.e., to be able to map and exchange objects and/or data thereof between systems.

A rule object type may be used to define and represent a rule, which may define conditions and actions corresponding to the conditions; i.e., actions to take if the conditions are met. Rules may be used to define smart contracts as described herein, among other things. A process object type may be used to define and represent a process, for example, a structured and repeatable workflow. A person object type may be used to define and represent a human being. In some embodiments of the system described herein, a data model includes one or more attribute types for defining attributes for an object. Attribute types may include, for example: a group attribute type; a role attribute type; a state attribute type; a safety attribute type; a security attribute type; a quality attribute type; a supply attribute type; a finance attribute type; a technical attribute; and a basic attribute. In some embodiments, other attribute types are included.

A Relation group attribute type is an attribute linking master data and data structures to each other. For example, a Relation could be something like X belongs to y. Possible Relations are: Assignment, Commissioning, Installation, Hierarchy, Classification and Successor. Assignment is a Virtual Process that assigns Sense/Edge to something, such as a customer, partner, user, blockchain or, more abstract, Sense/Edge can be something defined by a GMD object. Commissioning is physical process that links product information, a transportation unit, an MYNXG Sense and customer information and allows the monitoring of supply chain processes. Commissioning does not change elements involved, but instead, combines the elements. Commissioning is a relation that is temporary, a product is filled into a thing. Installation is a physical process where Edge/Sense are installed at things/products and where additional things/products are integrated. The involved Edge/Sense/Things/Product may create a new IoT subsystem that is further monitored. Hierarchy is a relation where one is part of another. Something is packed and is part of a loading product at pallet. Classification is a relation where things are grouped. A classification might be that particular products are hazardous and belong to a classified group of things, such as, for example, explosive gasses. Successor is relation where one is replaced by another. For example, all products with product number Y are replaced from a given date by the product with product number Z.

The role attribute type may be used to define a role for a person, including, for example, the capabilities and/or responsibilities of a person for an object. For example, the role attribute may be used to define a role with respect to (i.e., in association with) a particular process at a company site. The state attribute type may be used to define a state attributes for an object to manage things in a thing management network. The safety attribute type may be used to define one or more safety attributes for an object to manage things in a thing management network. The security attribute type may be used to define one or more security attributes for an object to manage things in a thing management network. For example, the security attribute may be used to specify confidentiality, integrity and availability attributes for such objects.

The quality attribute type may be used to define one or more quality attributes for an object to manage things in a thing management network. For example, the quality attribute type may be used to specify attributes of products and processes. The supply attribute type may be used to define one or more supply attributes for an object (e.g., a good) to manage things in a thing management network. The supply attribute may be particularly useful in managing a supply chain. The finance attribute type may be used to define one or more finance attributes for an object to manage things in a thing management network. For example, finance attributes may include any attributes having to do with finance or trade. The technical attribute type may be used to define one or more technical attributes for an object to manage things in a thing management network. For example, technical attributes may include a private email address or phone number of a person. The basic attribute type may be used to define one or more basic attributes for an object to manage things in a thing management network. Basic attributes may include, for example, basic biographical information about a person, e.g., name, address, city, state, ZIP code.

A plurality of different complex data objects may be defined using various combinations of the object types and attribute types described herein, which then may be utilized by one or more components of a thing management network to manage things, for example, as described in more detail elsewhere herein. For example, as an illustrative embodiment, a person object (i.e., an instance of a person object type) may be defined for a thing management network using one or more different attribute types and/or object types as follows:

One or more basic attributes may be defined, including, for example: first name; given (i.e., family) name, address information (e.g., ZIP code, city/town, street name, street number);

One or more technical attributes may be defined, including, for example, personal (i.e., private) email address (es), business (i.e., company) email address(es); personal cell phone number; and business cell phone number;

One or more role attributes may be defined, including, for example:
 Employer (e.g., company, government organization, education institution or individual) of the person,
 Position (e.g., rank) within employer,
 Competencies, e.g., for what processes or things the person has competencies,
 User access rights to information and/or processes within a thing management network, e.g., as an MYNXG® user within am MYNXG® network made available by MyOmega or MYNXG affiliates One or more security attributes may be defined for the person, for example:
 a user password to gain access (which may be stored in encrypted mode) or might be provided by a user authentications service or software e.g. OAuth 2.0 which would provide tokens to grant access,
 subscriber identity module (SIM) data and identifier, which may be used as attributes for other objects to associate the person with the other objects, One or more safety attributes may be defined for the person, for example:
 an IMEI of a cell phone of the person; classifying the cell phone for usage in hazardous areas e.g. according to NEC 500/505 or ATEX classifications.

One or more site objects, and process objects for each site object, may be defined for a person.

As another illustrative embodiment, a company object (i.e., an instance of a company object type) may be defined for a thing management network using one or more different attribute types and/or object types as follows:

One or more basic attributes may be defined including, for example, the country in which the company is incorporated;

One or more finance attributes may be defined including, for example, a governmental (e.g., trade) registration number, or a tax ID (e.g., a VAT number)

One or more site objects may be defined for sites of the company, where each site object may have one or more attributes defined including, for example:
 One or more basic attributes, for example, site address information, e.g., ZIP code, town/city, street name, street number; and
 One or more technical attributes, for example, GPS coordinates of the site, site maps, installation blue prints; WIFI networks on site, cells of wireless phone networks covering at least part of the site As another illustrative embodiment, a process object (i.e., an instance of a process object type) may be defined for a thing management network using one or more different attribute types and/or object types as follows:

One or more safety attributes specifying, for example, a safety classification of a process, e.g., for hazardous environments, which could be used, for example, in defining a rule object;

One or more product objects specifying one or more products involved in the process, each of the one or more product objects including, for example:
 One or more basic attributes including, for example, a unique product ID, e.g., according to the GS1 product naming conventions as specified as of the date of filing at https://www.gs1.org/ and/or in related documents.
 One or more quality attributes, e.g., specifying values for one or more quality metrics of the product One or more thing objects specifying one or more things involved in the process, each thing object including, for example, one or more technical attributes, e.g., a unique ID of the thing within the thing management network, a product ID and/or serial number.

One or more rule objects specifying one or more rules (e.g., conditions plus actions) for the process One or more role attributes specifying one or more roles, including for example, the competences needed to execute the process (e.g., through competence profiles, the requirements of person may be specified.

A variety of different objects may be defined, including any of those depicted in relation to FIGS. 6A-6H. FIGS. 6A-6H illustrate examples of data objects, according to embodiments of the system described herein. Accordingly, the discussion of objects herein, including test, arrangement, manipulation, etc. generally refers to the objects illustrated in FIGS. 6A-6H and the corresponding discussion.

Figure 6B:
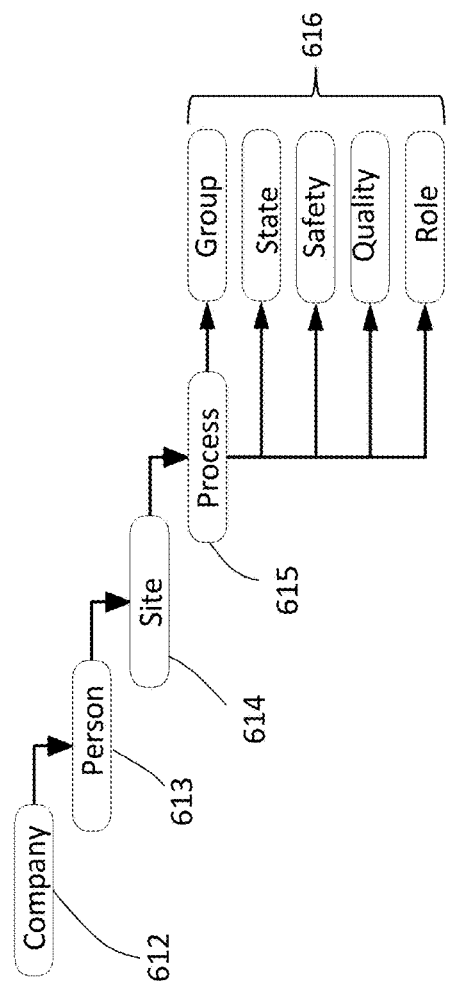
Figure 6D:
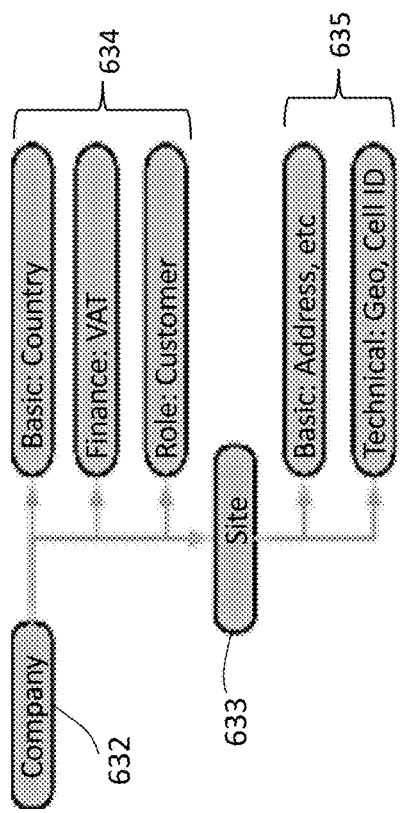
Figure 6A:
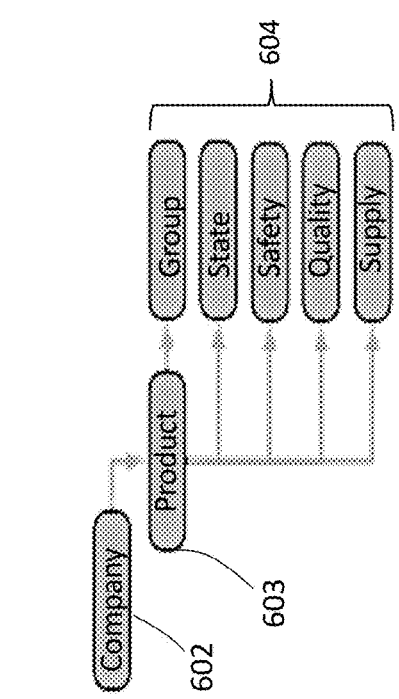

FIG. 6A illustrates a product object 603, for a product offered by a company represented by company object 602, the product being defined to have attributes 604.

FIG. 6B illustrates a person object 613 for a person associated with a company represented by a company object 612, and a process object 615 for a process for which the person has competencies at a site represented by a site object 614, the site associated with the company represented by the company object 612. The process object 615 has multiple attributes 616, including a role that may specify competencies of the person with respect to the process.

Figure 6C:
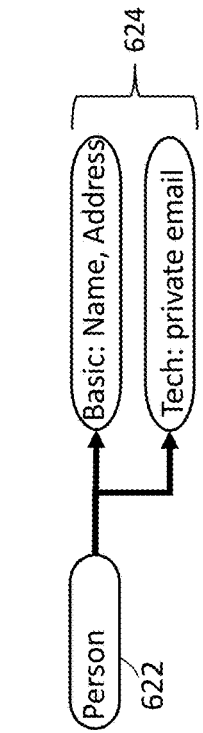

FIG. 6C illustrates an example of a person object 622 having basic and technical attributes 624. In some embodiments of the system described herein, the person object 622 has a minimum of attributes that may be required to be defined for a person object to be able to be used in a thing management network (e.g., the thing management network 100).

FIG. 6D illustrates an example of a company object 632 with attributes 634, including a role attribute indicating that the company represented by the company is a customer. A site object 633 defines a site associated with the company represented by the company object 632. The site object 633 includes basic and technical attributes 635. In some embodiments of the system described herein, the site object 633 has a minimum of attributes that may be required to be defined to be able to be used in a thing management network (e.g., the thing management network 100).

Figure 6E:
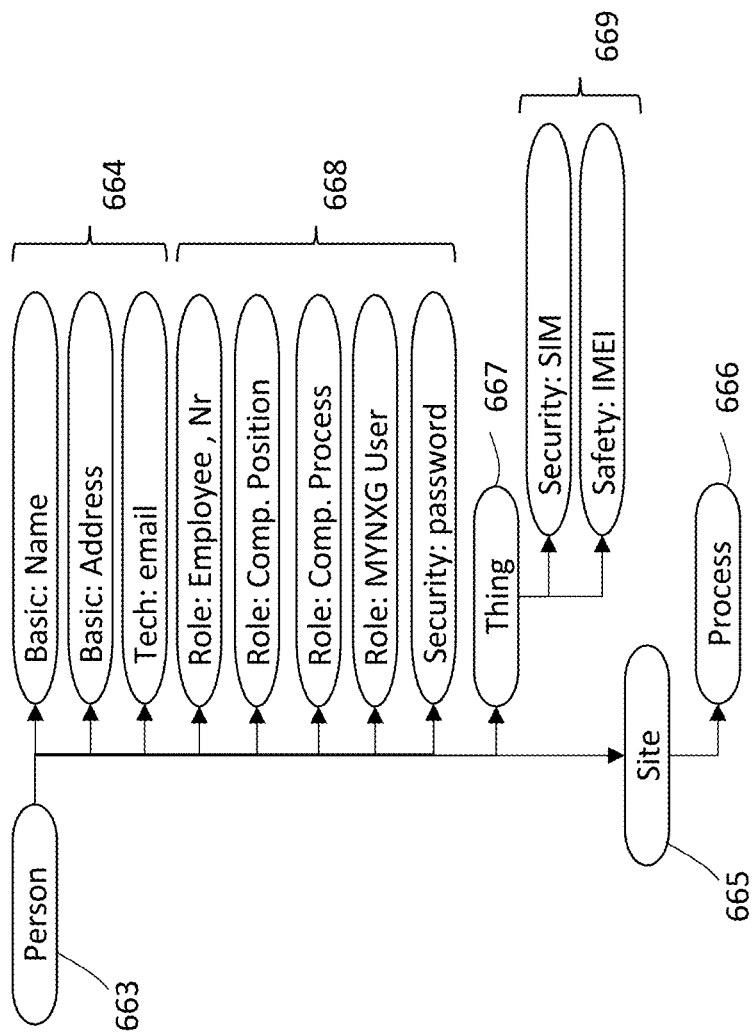

FIG. 6E illustrates an example of a person object 663, including an associated site object 665 having an associated process object 666. A plurality of attributes 664, 668 are defined for the person object 663. Some of the attributes 664 are for data related to the GPRS (General Data Protection Regulation) being adopted by European countries. The person object 663 may also be associated with a thing object 667 having attributes 669 corresponding to mobile related data. In some embodiments of the system described herein, the objects and attributes illustrated for the person object 663 in FIG. 6E represent a minimum of object and attributes that are required to be defined for a person object to be able to be used to provide a threshold level of access control and security for a site on a thing management network, for example, the thing management network 100.

FIG. 6F illustrates an example of a company object 642 representing a company A. The company object has a plurality of associated objects 644 including a site object and a relation process A and a relation process B, which indicate that Process A and Process B are carried out by the company. Process B is shown as having associated objects 646 including a product, a thing, and a rule. The rule object has associated objects 648 corresponding to different required states and a required competency (role) of a person carrying out the process.

FIG. 6G illustrates an example of a person object 652 having associated object 654 corresponding to roles (competencies) of the person object 652. There may also be other objects 656 associated with the person object 652 including an associated site and an associated process.

Figure 6H:
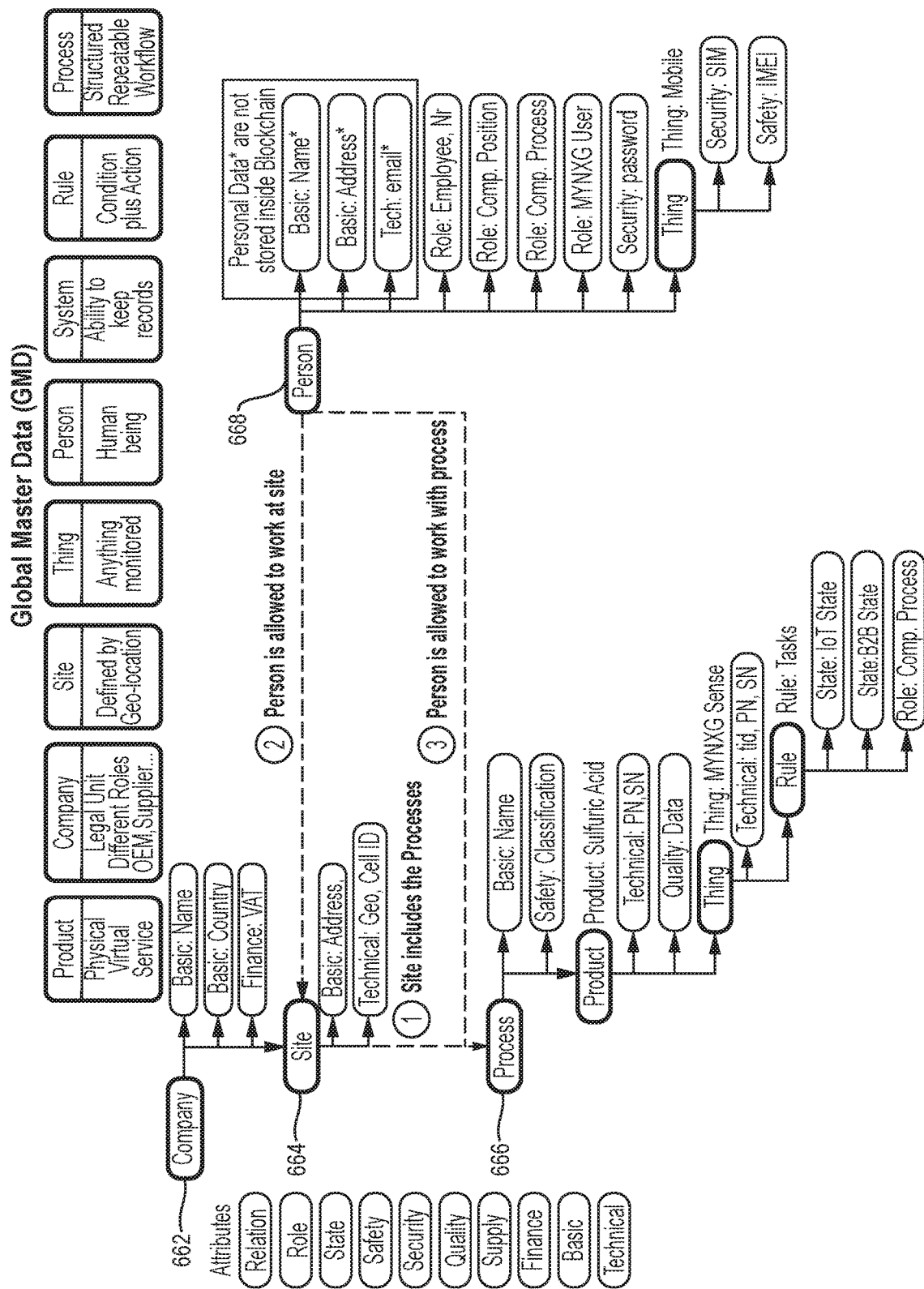

FIG. 6H illustrates relation hierarchy and relationship assignments for a company object 662. The company has a corresponding object 664 for a site of the company and a corresponding object 666 for a particular process performed by the company at the particular site. Another object 668 for a person includes a plurality of associated objects for the person including name, address, etc. as well as various roles for the person and data for the mobile phone of the person. There are various relationships between the objects 664, 666, 668. For instance, there is a hierarchical relationship between the object 664 corresponding to the site and the object 666 corresponding to the process; the process is performed at the site. Also, there is an assignment relation between the object 664 corresponding to the site and the object 668 corresponding to the person; the person is assigned (allowed to) work at the site (or not). Similarly, there is an assignment relation between the object 666 corresponding to the process and the object 668 corresponding to the person; the person is assigned (allowed to) work with the process (or not).

As is described in more detail herein, one or more applications or logic executing on one or more of the components of a thing management network (e.g., the thing management network 100) may utilize data objects created using the object types and/or attribute types of the data model described herein. For example, such data objects and one or more components of the security module 400, executing on a user device, gateway, server and/or monitoring device, may be used to manage (e.g., remotely) visitor access to a site and access to resources at the site. In some embodiments of the system described herein, management of such access includes monitoring information associated with the site and/or resources thereof, as described in more detail herein.

It should be appreciated that the data objects described herein may be created once, and reused (and modified) at multiple sites for multiple companies, and for any visitors to these sites, and through the use of blockchain technology as described herein, may be used reliably and efficiently (e.g., by employing the streamlined blockchain communication sequence).

Figure 7:
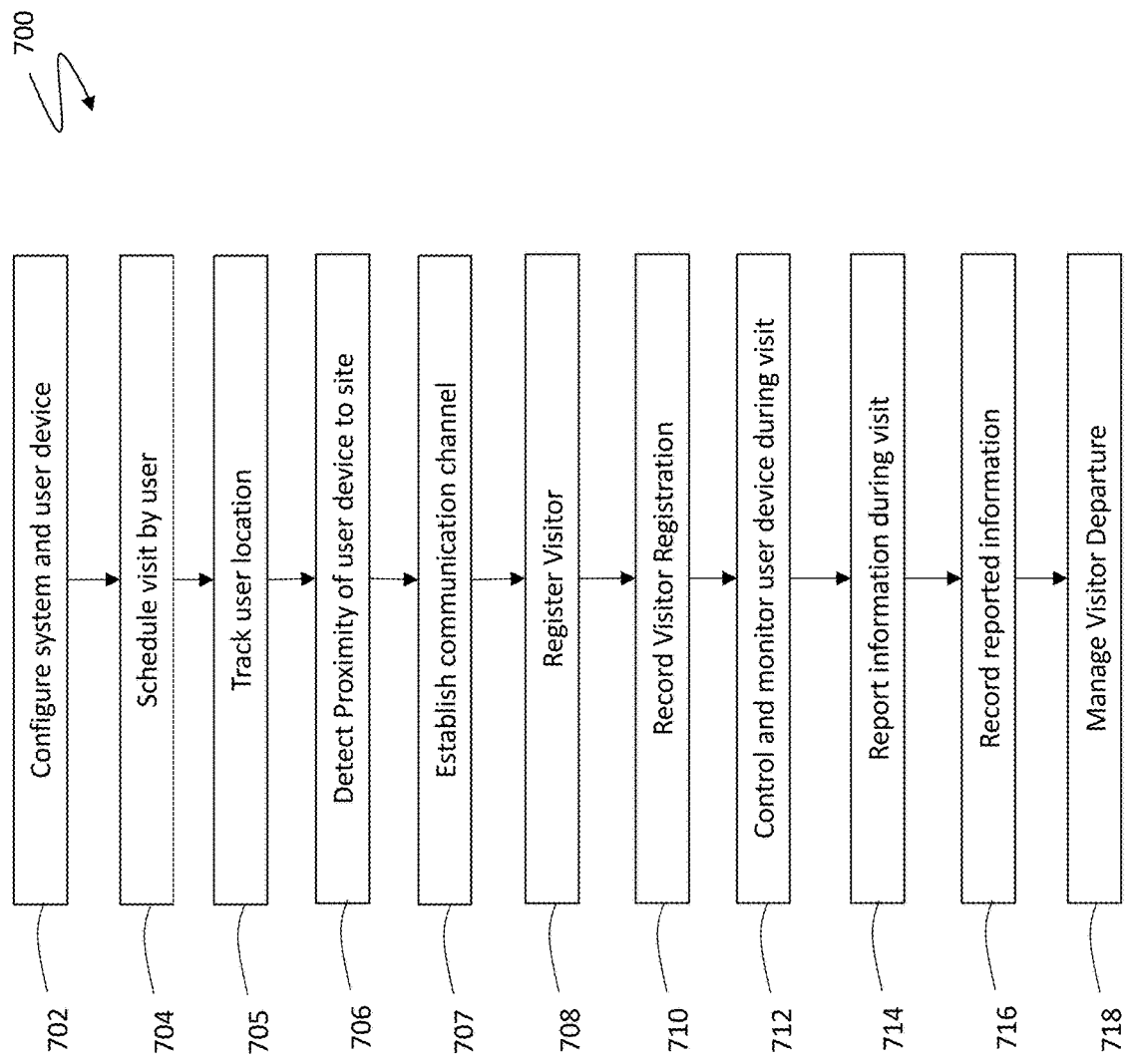
FIG. 7 is a flowchart illustrating remotely managing a visitor device, according to embodiments of the system described herein.

The data objects described herein may be used in combination with the systems and blockchain techniques described in relation to FIGS. 1-4 to manage security and safety on company, governmental or academic sites. For example, the data objects, systems and techniques described herein may be used to implement one or more safety standards including, for example, NEC 500, NEC 505 and ATEX standards. In some embodiments of the system described herein, the data objects, systems and techniques described herein may be used to implement safety functions in hazardous environments including, for example, hazardous environments defined by the following:
1. NEC 500, Class I Zone2
2. NEC 505, Class I Zone 1 and 2
3. ATEX, Group II, Category 2G and 3G FIG. 7 is a flowchart 700 illustrating remotely managing a visitor device, according to embodiments of the system described herein. Other embodiments of remotely managing a visitor device, for example, variations of the method illustrated by the flowchart 700, are possible and are intended to fall within the scope of the invention.

In a step 702, one or more components of a thing management system may be configured for managing visitor access to a site and/or resources thereof. The one or more components may include one or more components of a server, gateway and user device as described herein. In some embodiments, the one or more components may include other components of a thing management system, for example, a monitoring device. Processing performed at the step 702 is described in more detail elsewhere herein.

Following the step 702 is a step 704 where a visit by a person to a site may be scheduled. Such scheduling may include a user (e.g., through use a web browser or visitor access app of a user device) accessing a server portion of a visitor access management application that resides on a server using a user interface, and entering information about the visit, for example, the site and reason for the visit. Entering of the information may result in a check that compares the person object and validates the person object relation with the site object. The site may or may not have a relationship with a person object representing the user. In the case of the person having a relationship with the site, the visit is confirmed. In another embodiment, the person object must provide additional information such as a driver's license and possibly visitor training, which the visitor might execute via a web portal and which might be approved at the site so that access rights to the site might be granted. In another embodiment, a hauler may apply to deliver products to the site and the product object related to the transport may, for example, be specified by a Certificate of Analysis certifying chemical goods transported in a tank trailer. It might be that the hauler may be requested to enter more information and to present or attach documents via a web portal.

Following the step 704 is a step 705 where the geo-location of the user may be tracked. For example, mobile telephony and GPS systems may be used to track the location of the user device. For example, the user device may transmit periodic communications (e.g., heartbeats) that include one or more pieces of information that identify the user (e.g., the person object ID corresponding to the user) and user device (e.g., the ID of the user device) and a location of the user device (e.g., a current cell ID and/or GPS coordinates of user). These communications may include, and be recorded as, one or more block chain transactions.

In some embodiments, a visitor access management application or another application or logic (e.g., a location service) in the service or transformation layer may calculate a geo-location of the user device based on the periodically transmitted information, and estimate a time of arrival of the user at the site to be visited.

In some embodiments, an inventory application in the transformation layer or another application or logic in the transformation layer or service layer may record the tracking information relating to the approaching user (i.e., prospective visitor). For example, block chain transaction records may include the person object of the visitor, including one or more role attributes pertaining to the person serving the role of guest (i.e., visitor).

Following the step 705 is a step 706 where a proximity of the user to the site may be detected. For example, from the geo-location information included in the heartbeat communications received from the user device, it may be determined when the physical location of the user device (and thus the user) are within a predefined threshold distance from the site. For example, it may be determined that the current cell ID (of a mobile telephony network being used) of the user device is the same as a cell ID of the site, or the GPS coordinates of the user device may be determined to be within a certain distance of the site.

Following the step 706 is a step 707 where, in response to detecting that the user device is within a certain proximity of the site, a communication channel between the site and the user device may be established, e.g., the user may establish WIFI access to a WIFI network of the site. For example, the server portion of the visitor access management application, or another application or component of the thing management network, may communicate (e.g., via the mobile telephony network) to the user device, sharing the WIFI network information including an SSID name and a temporary password (e.g., a temporary password) of a site WIFI network, e.g., the WIFI network corresponding to a reception area or security gate of a site. In response to receiving the WIFI network information, the visitor access app on the user device may activate (if not active already) the WIFI interface of the user device, select the WIFI network and provide the password to establish a communication channel via WIFI.

Following the step 707 is a step 708 where a user may be registered as a visitor to the site. This registration may include the visitor access app providing instructions (e.g., visually and/or orally) to enter the reception area of the site to check-in, and the thing management network noting/acknowledging that the visitor is now on site.

In some embodiments, registration may include validating one or more software modules of the user device, including, e.g., the visitor access app. This validation may include use of one or more credentials described in relation to the security module 400, which may be included in the user device. In some embodiments, the user device does not include all of the necessary components (e.g., of the security module 400) to validate the software modules on its own. In such embodiments, a dongle (e.g., the dongle 414) may be provided on site that includes one or more components of a security module (e.g., the security module 400) of the user device through which validation of one or more software modules may be performed, for example, as described in relation to the security module 400. For example, the dongle may provide the transitory portion 142b of the security module 142 of the user-device 141.

In embodiments of the step 708 in which a dongle is employed, the step 708 may include a dongle being provided to the user at the reception area, which then may be connected physically and/or wirelessly as described in relation to security module 400, after which the one or more software modules on the user device may be validated. In an embodiment, the dongle 414 may be implemented by utilizing the monitoring device 123 that is designed according to FIG. 2 and contains an RFID NFC reader for the sensor 220 that communicates via RFID NFC with one of the user devices 140, 141 and validates one or more software modules thereon.

If the software modules are validated (with or without use of a dongle in whatever form), the user device (e.g., the visitor access app thereof) may exchange one or more communications with the server portion of the visitor access management application to complete registration. The communications may involve an exchange of one or more blockchain transactions, for example, using a streamlined blockchain communication sequence as described elsewhere herein. The communications may be encrypted with the private blockchain credential (e.g., the private blockchain credential 422). A data heartbeat communication transmitted from the user device to the server, or from an intervening gateway to the server, or from an monitoring device to the server, as part of the streamlined blockchain communication sequence, may include the ID of the user device (e.g., the IMEI), the person ID of the visitor, other objects and attributes, and an indication that the one or more software modules on the user device have been validated (e.g., visitor access app=OK)

In some embodiments, the visitor (i.e., the person visiting the site) may be an owner of the site or an employee or other authorized personnel of the owner of the site, in which case validation of one or more software components may not be required, because the software components may have been previously validated for the site. In such embodiments, if a dongle is employed, the dongle may have been previously issued to the visitor and may be already connected (physically or wirelessly) to the user device. Furthermore, in such embodiments, the user device may be presented to an NFC reader or other type of scanner/reader for which the user device is configured to communicate. The scanner/reader may be communicatively coupled to a gateway of a thing management network. For example, a gateway may be configured to serve as a gateway of the thing management network for all visitors that enter the site through the reception area. In response to establishing communication with the reader/scanner and/or gateway, the user device or gateway may exchange one or more communications (e.g., engage in a streamlined blockchain communication sequence) with the server portion of the visitor access management application to complete registration.

In embodiments in which a dongle is provided to the visitor during visitor registration, the dongle may be returned (e.g., to a reception desk) after the registration (including any software validation) is complete. In embodiments where the dongle is implemented by utilizing the monitoring device 123 that is designed according to FIG. 2 and contains an RFID NFC reader for the sensor 220 communicating via RFID NFC with one of the user devices 140, 141, the monitoring device 123 may be integrated into a reception area, visitor terminal, door reader, etc. and the visitor may place the user device/user equipment within a short distance towards the monitoring device 123. A user interaction in whatever form may signal towards the user that the registration and the software validation is complete.

Following the step 708 is a step 710 where the visitor registration may be recorded, e.g., archived, on a gateway, server and/or other component of a thing management network. In some embodiments, in response to the visitor being registered, the visitor receives on the user device information concerning the site and visit, for example, a site map and safety instructions. This information and other information may be presented to the user as part of terms and conditions that the user must accept before being able to continue further onto the site and/or before being able to use the user device within the site.

If the user agrees to the terms and conditions presented as part of the step 710, a transaction (e.g., a blockchain transaction) of the visitor's registration may be recorded, e.g., stored in one or more components of the thing management system. Recording visitor registration information may include exchanging one or more communications with a gateway and/or server, for example, as part of a streamlined blockchain communication sequence. The recorded registration may include any of a variety of information (e.g., using one or data objects and attributes thereof) including, for example, an ID of the visitor (e.g., using the person object for the visitor with role attribute set to guest), an ID of the user device (e.g., the IMEI of the user device), a site ID, the site map, safety attributes including safety instructions (e.g., according to a safety category such as none, yellow, red), the WIFI and mobile telephony networks used, access codes (e.g., WIFI network and/or NFC codes), which may include codes to one or more places of things (e.g., locks) on the site, and any suitable combination of the foregoing. In some embodiments, the recorded registration information may include other information. The system described herein supports blockchain transaction in a way that complies with the EU GDPR regulations by splitting the data stored in the blockchain from such data that are referenced and can be easily deleted. In particular, the person objects 663 are split into attributes 664 that are stored outside the blockchain (i.e., not part of the blockchain) and attributes 668, 667, 669 and relations to further objects that are stored inside the blockchain (i.e., are part of the blockchain).

Following the step 710 is a step 712 where the user device may be monitored and controlled during the visit on the site. A state in which the user device is being monitored and controlled during a visit to a site may be referred to herein as the user device being in an active visitor mode.

Following the step 712 is a step 714 where information detected or determined (e.g., by the user device) about the visitor and user device of the visitor may be reported, for example, from the user device and/or one or more monitoring devices to a gateway and/or directly to a server of a thing management network. In some embodiments, such information is not reported during the visit, but only at (or immediately following) the end of the visit as the visitor exits active visitor mode and departs the site, as described in more detail elsewhere herein. The reported information may include any detected or determined information described herein. The reporting of the information may include exchanging one or more communications between devices, for example, as one or more transaction records of a blockchain in accordance with the streamlined blockchain communication sequence.

In some embodiments, a visitor access app on the user device may transfer data on a bare minimum need (e.g., 6 Kbyte per hour) during the active visitor mode; e.g., from when the user device entered the active visitor mode until the user device returns to a reception area at the site. In some embodiments, no other costs are incurred by the visitor (or an employer of the visitor) during active visitor mode. In some embodiments, the communication is only permitted if the user device/user equipment which is referenced via the nonvolatile IMEI of the user device/user equipment is a device categorized according to an ATEX, NEC 500, NEC 505 classification for the usage in hazardous environments.

Following the step 714 is a step 716 where the information reported in the step 714 may be recorded (i.e., stored), for example, on one or more gateways and or servers, for example, as blockchain transaction records as part of a secure transaction register and/or distributed ledger of blockchain transactions. In some embodiments, blockchain transaction records may remain permanently encrypted and maintained in accordance with tax and other regulations and in some cases data may be stored outside the blockchain to guarantee compliance with the GDPR under EU Law.

Following the step 716 is a step 718 where a departure of the visitor from the site may be managed, for example, as described in more detail elsewhere herein. Following the step 718, processing is complete.

It is possible to adapt some of the processing illustrated in connection with the flowchart 700 to implement features compliant with the GDPR and with EU regulation for the duty to record working times of employees. Specifically, the step 702, 704, 705 may be adapted to allow workers to indicate when they are and are not working off site using, for example, the mobile phone of the worker. For instance, a worker may schedule working off site (e.g., at home) in a manner similar to the scheduling performed in connection with the step 704, described above. In response to this, different checks may be performed, such as determining whether the worker is authorized to work off site. The system may execute additional tasks for the employer that, for example, perform transactions related to the worker working off site. The system may record efforts spent by the worker in order to compensate the worker correctly for the work off site. It is also possible to use the mobile device (smartphone) of the worker to track the geolocation of the worker while the worker is supposed to be working off site. For example, if the worker is supposed to be visiting clients or delivering items with his private car, the mobile device verifies that the worker travelled to specific locations to assure that the tasks were completed and to provide the worker with fair compensation. The mobile device or other device of the worker (e.g., a laptop) may also log the time along with possibly logging the work being performed by the worker (e.g., editing documents).

Figure 8:
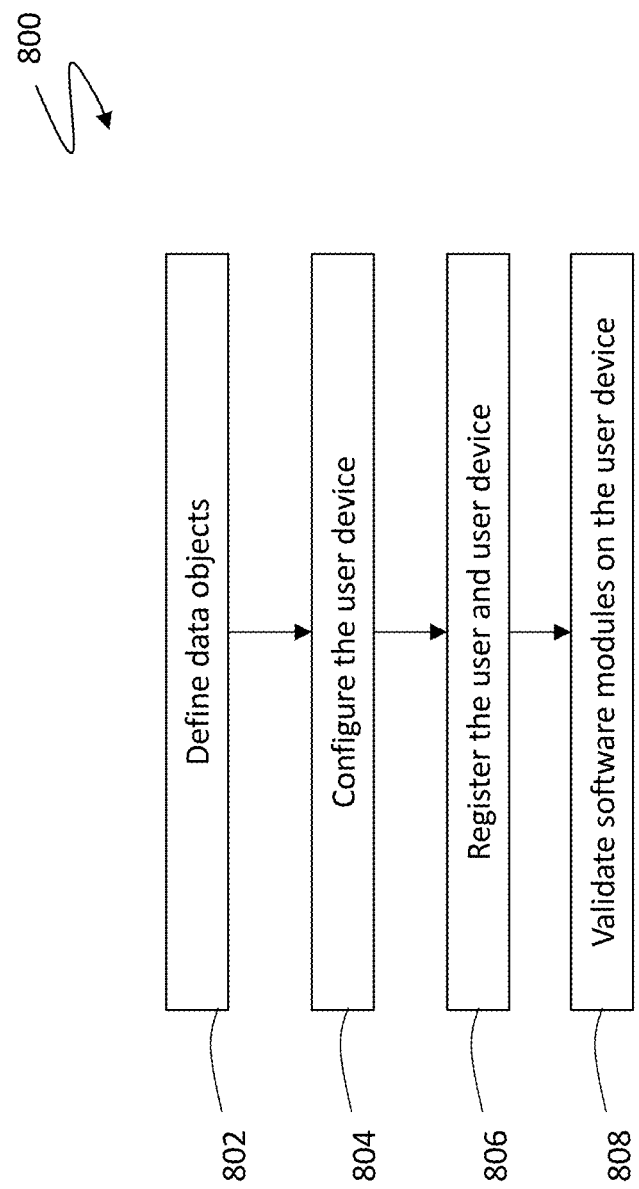
FIG. 8 is a flowchart illustrating configuring one or more components of a management system for managing visitor access to a site and/or resources thereof, according to embodiments of the system described herein.

FIG. 8 is a flowchart 800 illustrating in more detail processing performed at the step 702 of configuring one or more components of a thing management system for managing visitor access to a site and/or resources thereof, according to embodiments of the system described herein. Other embodiments of a method of configuring one or more components of a thing management system for managing visitor access to a site and/or resources thereof, for example, variations of the method illustrated by the flowchart 800, are possible and are intended to fall within the scope of the invention.

In a step 802, one or more data objects for managing things in a thing management network may be defined, including any of the data object described herein. For example, person object may be created (e.g., for a prospective visitor) having one or more basic attributes (e.g., name, address information) and one or more technical attributes (e.g., personal and/or business email addresses). It should be appreciated that such a person object may be created by the human resource for all employees of a facility, or for a guest independently of a prospective visit to a site, for example, prior to any knowledge of any potential visit to the site. That is, the person object may have been created when the person first became an employee or customer of a certain company, or first configured a user device. This person object may be used for a variety of purposes, including configuring a user device and creating a guest account, as described in more detail elsewhere herein.

The step 802 also may include defining one or more data objects and attributes for the person object for the person's role as a guest at a company site. For example, the person object may include one or more thing objects, product objects, company objects, site objects, rule objects and/or process objects, and one or more role attributes (including the role of guest), safety attributes and/or security attributes. These objects and attributes may collectively define a guest/employee account for the person with respect to the site, including the competencies of the person as a guest/employee with respect to one or more things, products and/or processes on site. In some embodiments, defining data objects may be performed in connection with other steps/processes.

Following the step 802 is a step 804 where a user device of the visitor may be configured with a visitor access app. For example, the step 804 may include using a user device (e.g., a smart phone) to initiate contact with a component of the thing management network, for example, a server portion of a visitor access management application or a separate registration application of a transformation layer of the network. For example, the contact may be initiated via an email message or through a browser of the user device accessing a user interface of a registration application in the cloud (e.g., in the transformation layer). The registration application may respond to the user device with an initial password for the user, and the user device may exchange one or more communications with the registration application to change the password. The registration application may use services provided by a user authentications service or software e.g. OAuth 2.0 which would provide tokens to grant access.

The step 804 also may include the visitor access app being downloaded to the user device for installation on the user device. As part of installing the visitor access app, terms and conditions for use of the visitor access app may be presented to the visitor, for example, on a screen of the user device. The registration application may require that the user electronically accept the terms and conditions before completing the installation. The terms and conditions to be accepted by the user may include, for example, one or more of the following:

User must register to the MYNXG Platform and provide true, correct and the full information about user identity, in particular, the correct first and last name and address and e-mail accounts for the exchange of information between the MYXNG Platform and the user. The user must take care that he receives the e-mails that are sent to the user e-mail account. The person data object contains the following user data that may be treated as personal data under the EU GDPR regulation: correct first and second name, address and e-mail accounts.

User must take care and is solely responsible for his passwords and the confidentiality of his passwords.

User data entered is treated as personal data by the user under the EU GDPR regulation and can be deleted if requested by the user. In such a case the visitor access app usage and the MYNXG platform usage are terminated.

In case of the need to contact the user, the visitor access app may use the personal data.

The visitor access app may not identify other apps, read or modify other data, utilize other data in any form than specified and intended by the visitor access application. The integrity and authentication check of the visitor access application is a check of the visitor access application and does not provide any health indication for the remaining User Device.

Geo-location information may be provided in accordance with the visitor access app to one or more components of the thing management network when the user device is possession of the person within a certain one or more sites or within a predefined proximity of such sites; i.e., when the user device is in "active visitor mode."

The visitor access app may activate and/or deactivate certain capabilities (e.g., features) of the user device during active visitor mode.

The user device may not be capable of being powered down (by the person or any other entity other than the visitor access app) during active visitor mode.

The visitor access app may transfer data on a bare minimum need (e.g., 6 Kbyte per hour) during the active visitor mode; e.g., from when the user device entered the active visitor mode until the user device returns to a reception area at the site; and that no other costs will be imposed on the person during active visitor mode.

The user device may receive vouchers and related information of a company that controls a site and/or of a business partner of the company, for example, food or beverage vouchers.

Communication functions and radio interface of the user device may be controlled during active visitor mode, including activation and deactivation of radios. In some embodiments, this condition may have an exception for the user device to be able to make emergency calls, but only if such a call will not itself trigger an unsafe/dangerous situation.

The NFC, BT and/or USB interfaces of the user device may remain enabled and be used by the visitor access app to communicate during active visitor mode with things managed by the thing management network.

After the visitor access app has been downloaded to the user device, the integrity of the visitor access app may need to be proven before any person in possession of the user device enters any site at which the visitor access app is employed.

The unique ID of the user device, for example, the IMEI if the user device is a cell phone, may be read and used to reference the user device towards one or more components of the thing management network if the visitor access app is in active mode.

Blockchain transaction records corresponding to a visit to a site at which the visitor access app is employed may be stored (e.g., on the thing management network), for example,
when entering the site and
when leaving the site Records may be kept in case of false behavior, and the records may be archived as blockchain transaction records on the thing management network, in line with the EU GDPR for personal data.

The blockchain transaction records may include encrypted data that will stay permanently within the blockchain, and, hence personal data under the EU GDPR regulations are not stored as part of the blockchain transactions.

After the active visitor mode is terminated, all initial settings of the user device may be restored to values that existed immediately prior to the active visitor mode being commenced.

No data in any form may be recorded outside of active visitor mode; i.e., when the user device is not in active visitor mode.

The visitor access app may consume, and thus require, approximately 1 MByte of non-volatile memory.

The visitor access app may be licensed for use solely as provided herein so that no right, title or interest to the visitor access app or any intellectual property rights therein are transferred.

In response to the user accepting the terms and conditions, the visitor access app may be installed on the user device as part of the step 804. Alternatively, the terms and conditions may be presented before allowing a download of the visitor access app to the user device.

It should be appreciated that, in various embodiments of the system described herein, one or more of the actions or functions described above in relation to the terms and condition may be implemented, for example, on the user device and/or on one or more other components of the thing management network, as is suitable.

In some embodiments of the system described herein, configuring the user device involves use of a dongle (e.g., the dongle 414 and functions of the dongle 414). For example, the user device may not be configured to perform the step 804 or portions thereof independently of a dongle, i.e., without use of a dongle, or a dongle functionality integrated in the user device, or the functionality of the dongle provided via the monitoring device. Upon, or prior to, being connected to the user device, a thing object having a unique ID may be created for the dongle. The dongle may register with the thing management network, for example, by defining one or more attributes allowing the dongle to participate in blockchain transactions on the thing management network.

Following the step 804 is a step 806 where the user and the user device may be registered with the thing management network, for example, one or more objects may be created and/or updated for the user and user device. For example, upon completion of the installation, the visitor access app may cause the user device to transmit a heartbeat communication to the registration application or another module of the transformation layer. The heartbeat communication may include a user ID of the person and an ID (e.g., IMEI) of the user device. The relationship of the user and user device may be registered for the thing management network, for example, by defining a thing object for the user device, which may define a thing ID (TID) as the user device ID (e.g., IMEI). Also, the person object of the user may be updated to include the thing object, thus establishing a relationship between the user and user device.

Following the step 806 is a step 808 where software modules on the user device may be validated, for example, as described in relation to secure component 418 of the security module 400. The validation may be recorded (e.g., stored) as part of a blockchain record, for example, on one or more gateways and/or servers of the thing management network.

Figure 9A:
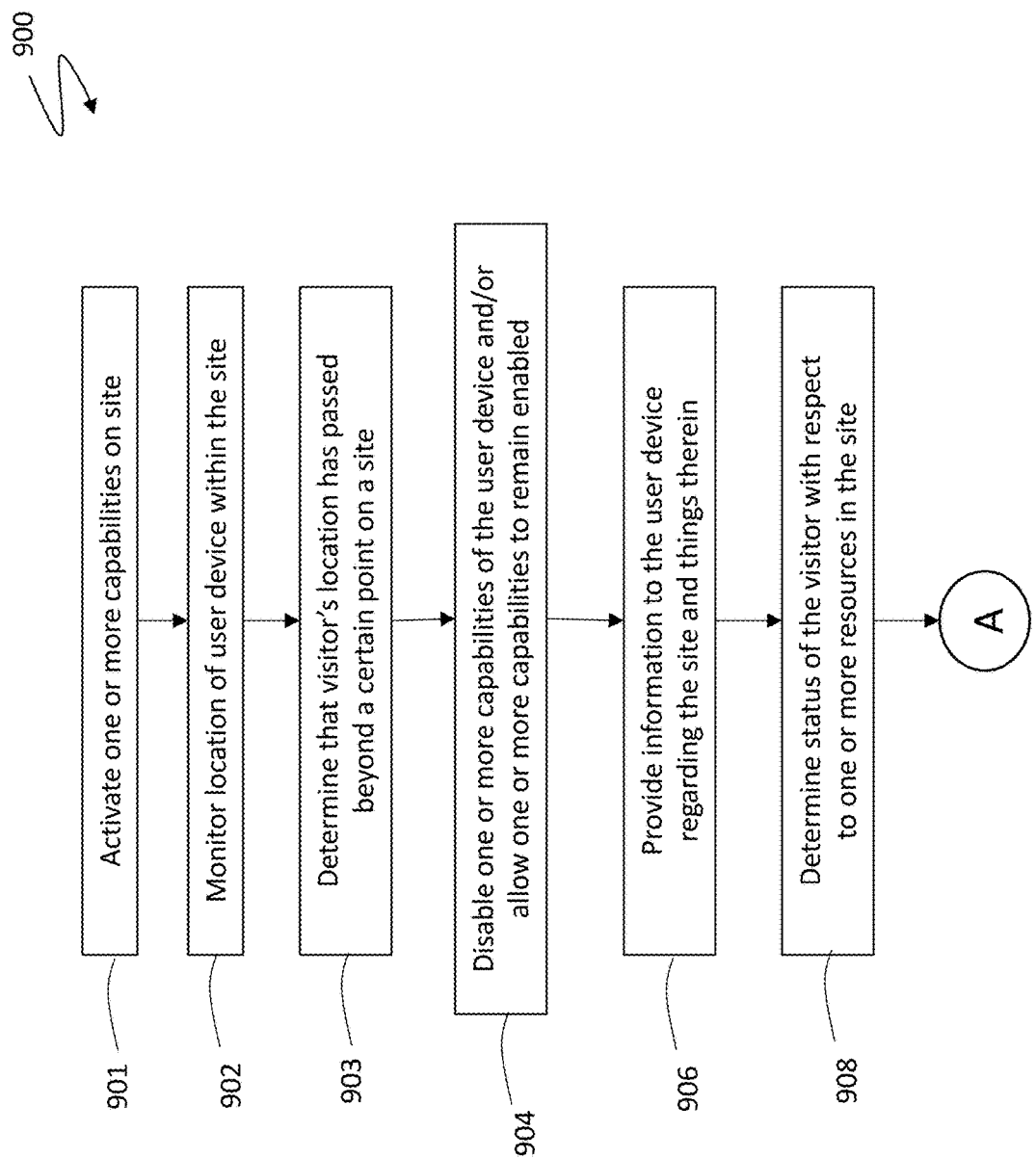
FIGS. 9A and 9B collectively are a flowchart illustrating monitoring and controlling a user device during a visit to a site, according to embodiments of the system described herein.
Figure 9B:
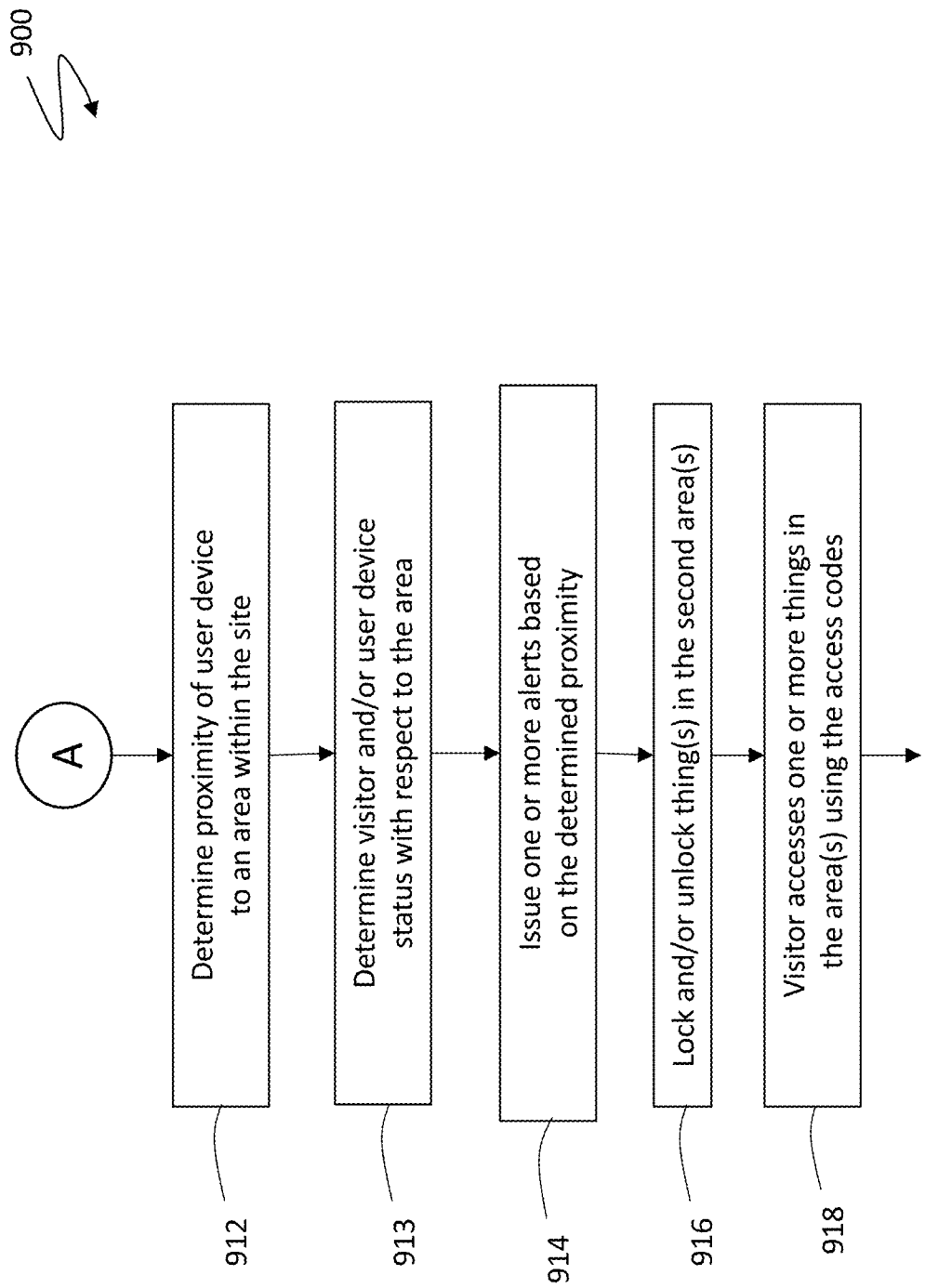

FIGS. 9A and 9B collectively are a flowchart 900 illustrating in more detail the step 712, discussed above, of monitoring and controlling a user device during a visit to a site, according to embodiments of the system described herein. Other embodiments of a method of monitoring and controlling a user device during a visit to a site, for example, variations of the method illustrated by the flowchart 900, are possible and are intended to fall within the scope of the invention. The method illustrated by the flowchart 900 may be performed while the user device is in active visitor mode.

Processing begins at a step 901 where one or more site capabilities may be activated, for example, in response to the user completing visitor registration (e.g., at a reception area). A user visiting a site may be referred to herein as a visitor. In addition, or alternatively, one or more site capabilities may be activated, as described in more detail elsewhere herein. Activating site capabilities may include initializing location monitoring and tracking of the user device, for example using WIFI signals, mobile telephony signals, GPS signals and perhaps other technology. Furthermore, BT communication may be activated to detect one or more BT beacons that collectively define a wireless alarm barrier, to be utilized as described in more detail elsewhere herein. In addition, the user device may be configured with a digital site map on which the position of one or more things or locations may be marked, which may be used as described in more detail elsewhere herein. In addition, the RFID NFC reader capabilities maybe be activated to provide access to existing legacy access systems and/or access to the functions provided through thing management network.

Following the step 901 is a step 902 where a location of the user device within the site may be monitored and tracked, using WIFI signals, mobile telephony signals, GPS signals and perhaps other technology, where the monitoring and tracking may have been activated in the step 901. Any information tracked may be stored on a server and/or gateway of the thing management network, for example, as a blockchain record of a secure transaction register.

Following the step 902 is a step 903 where it is determined if a visitor has passed beyond a certain point, or come within a certain distance from a location, on a site, for example, using a WIFI signal at a reception area, GPS location, strength of mobile telephony signal received by one or more base stations or using other networking technologies.

In a response to the determination at the step 903, processing continues to a step 904 where one or more capabilities (e.g., features) of the user device may be disabled (e.g., remotely) while one or more other capabilities of the user device are allowed to remain enabled and/or one or more capabilities. For example, radio, mobile telephony and/or WIFI communication capabilities may be disabled on the user device, whereas other capabilities, for example, GPS, NFC and BT, may remain enabled on the user device. A location of the user device within or in proximity to the site may be monitored, and the disabled capabilities may be controlled to remain disabled until the visitor exits the site or passes beyond a certain distance from the site. In some embodiments, disabling the radio, mobile telephony and/or WIFI capabilities may be overridden on the user device by the visitor to place emergency calls. In some embodiments, overriding may only be allowed if the emergency call itself does not trigger an unsafe/dangerous situation. In some embodiments, the step 904 may include controlling the user device so that the user device is not be capable of being powered down, for example, by the visitor or any other entity, other than the visitor access app, during active visitor mode. In some embodiments, the user device may be configured with an ability to read at least one of a QRC label or RFID UHF tag on goods or other things while on site.

Following the step 904 is a step 906 where information regarding the site, including, for example, things within the site and processes to be performed on site (e.g., using the things) and/or in relation to the site may be provided (e.g., communicated) to the user device. The information may include one or more access codes to access one or more things, for example, to unlock one or more locks that provide access to a place (e.g., a door or gate to a restricted area) or to operate a computer, machine, vehicle or piece of equipment (perhaps for safety reasons). Such access codes may be displayed to a visitor for manual entry by the visitor or may be automatically applied by the user device.

Following the step 906 is a step 908 where a status of a visitor with respect to one or more resources on site may be determined. For example, one or more data objects associated with the visitor and/or site may be accessed, for example, from a gateway and/or server. A person object may specify a site object for the site, and one or more process objects associated with the person object, and specify one or more role attributes, these objects and attributes collectively defining one or more competencies of the visitor with respect to one or more processes (involving one or more things) on the site. A separate company object may include one or more site objects, and one or more process objects, product objects, thing objects and rule objects for the company site, in relation to the one or more processes. The person object and the company object may be compared to determine the status of the visitor with respect to the one or more products, things and processes specified for the site, for example, the permissions the visitor has with respect to places and things on the company site.

Following the step 908 is a step 912 where a proximity of the user device (and by inference the user) to an area (e.g., a restricted area and/or hazardous area) within the site may be determined using geo-fencing. In some embodiments, such proximity may be determined by comparing coordinates of the areas with the current coordinates (e.g., being tracked using GPS); e.g., by determining a distance between the coordinates of the area and the current coordinates of user device. In some embodiments, the proximity of the user device may be determined by the detection of BT signals being transmitted by BT beacons. The transmitters transmitting the BT beacons may have been physically arranged, and the properties (e.g., strength) of the signals transmitted therefrom configured, to create a BT barrier. This BT barrier may define a perimeter of the area or a perimeter proximate to perimeter of the area.

Following the step 912 is a step 913 where a status of the visitor and/or user device with respect to the area (or more generally the site) may be determined, for example, by accessing one or more pertinent data objects (e.g., person object, thing object, site object, company object, etc.) and analyzing and comparing the attribute value of each, including for example safety and role attributes, to determine the status of the visitor and/or the user device with respect to the area. For example, pertinent data objects may define qualifications of a visitor for certain work with processes or things on a site. The following are some examples:

1. A person object may specify qualifications of a person in detail using the following attributes and objects:
    a. Role attributes: Comp. Process (specifying processes for which the person is competent), Safety Operations (e.g., according to Zones 0,1,2 of the hazardous environments as classified under NEC 500, NEC 505 and ATEX, which may be indicated to the user with Red, Yellow, Green Zones.);
    b. Safety attributes: IMEI, to specify the user device of the person according to Zones 0,1,2 of the hazardous environments as classified under NEC 500, NEC 505 and ATEX, which may be indicated to the user with Red, Yellow, or Green marked user devices.
    c. Site and Process objects to define the person's detailed access rights (e.g., via NFC codes, or via QRC labels).
2. A process object may specify process requirements in detail using the following attributes and objects:
    a. Safety attributes to provide process safety classifications; and
    b. Products, things and rules to be applied for the process.
3. A company object is used to specify the mobile telephony, WIFI and geo-fencing attributes for the site, including:
    a. Site objects specifying technical attributes of co-ordinations, one or more mobile cell IDs of the site, etc., Technical co-ordinations and Mobile Cell ID
    b. Site objects specifying a technical attribute of WIFI ID
    c. Site objects specifying site maps, geofencing areas and BT barriers.

It should be appreciated the determination of the status of the visitor and/or the user device with respect to the area may have been performed prior to the detection of proximity to the area.

Following the step 913 is a step 914 where, in some embodiments, in response to the detection of the proximity, for example, a restricted or hazardous area (via geo-fencing or a BT barrier), one or more alerts may be issued. The one or more alerts may include a written electronic communication to one or more entities, for example, a gateway and/or server, security personnel and/or administrators of the site, or to the user device of the visitor, for example, as an email message, text message or other notification that may pop-up on the screen of the user device. The one or more alerts may include playing a sound (e.g., a ringtone) on the user device or vibrating the user device. The one or more alerts also may include a sound external to the user device (e.g., of a horn, buzzer or siren) and/or a visual indication on the physical premises (e.g., a blinking light, or the closing or lowering of a door, gate or barrier).

In some embodiments, a gateway may be installed near (e.g., just outside) of a hazardous or restricted area, and include or be coupled to one or more physical devices (e.g., lights, speakers, doors, gates) that are physically close to the gateway, and the gateway may control an alert being issued using one of the physical devices in response to the above-described proximity detection.

Whether or not to issue an alert in the step 914, and the type of alert to issue, may depend on a safety classification of the area and a status of the visitor and/or user device with respect to the classification. For example, a hazardous or restricted area may have a safety classification of "Yellow"

or "Red" or have no safety classification. Furthermore, the visitor may have a safety attribute object defined with respect to the site (e.g., in a person object of the visitor associated with the site), for example, or "Red", "Yellow" or none. Similarly, the user device may have a safety attribute defined for the site as well, e.g., a mobile safety equipment rating of Zone 1 or Zone 2. If the safety classification of the visitor and user are sufficient (i.e., qualified for red and yellow access, and the area has a safety classification of yellow), then no alert may issue. However, if the visitor is only qualified (via a safety attribute) for yellow, and the area has a safety classification of red, an alert may issue. The type (e.g., severity, and whether a sound, visual indication and/or electronic notification) of the alert may depend on any of: the safety classification of the area; the safety qualification of the visitor; the safety qualification of the user device, the difference (e.g., in priority/severity between any two of these attributes, and perhaps other factors (e.g., time of day, day of week, etc.). The issuance of an alert may be communicated and stored as a blockchain transaction record to/on one or more components of the thing management network per techniques described in more detail elsewhere herein.

In some embodiments, issuing alerts may be considered a first line of defense in preventing a visitor from access a restricted, perhaps dangerous, area. Other techniques and mechanisms for preventing such access, including locks and/or access codes, may serve as a second (or more) line of defense.

Following the step 914 is a step 916 where, in some embodiments, in response to the detection of the proximity, one or more things in the area or that allow access to the area (e.g., a lock on a door or gate, or a vehicle, machine or device) may be locked or unlocked. Whether or not to lock or unlock a lock mechanism may depend on a safety classification of the area and a status of the visitor and/or user device with respect to the classification, for example, in a manner similar to as described above in relation to the step 914.

Following the step 916 is a step 918 where, in some embodiments, in response to the detection of proximity of the user device, the visitor may be provided one or more access codes to access the area using the one or more codes, or not be provided the one or more access codes so that the user cannot access the area. Whether or not to provide the access codes may depend on a safety classification of the area and a status of the visitor and/or user device with respect to the classification, for example, in a manner similar to as described above in relation to the step 914.

It should be appreciated that one or more communications transmitted in connection with the method illustrated by the flowchart 900 may be transmitted as block chain transactions, for example, in accordance with the streamlined blockchain communication sequence.

Figure 10:
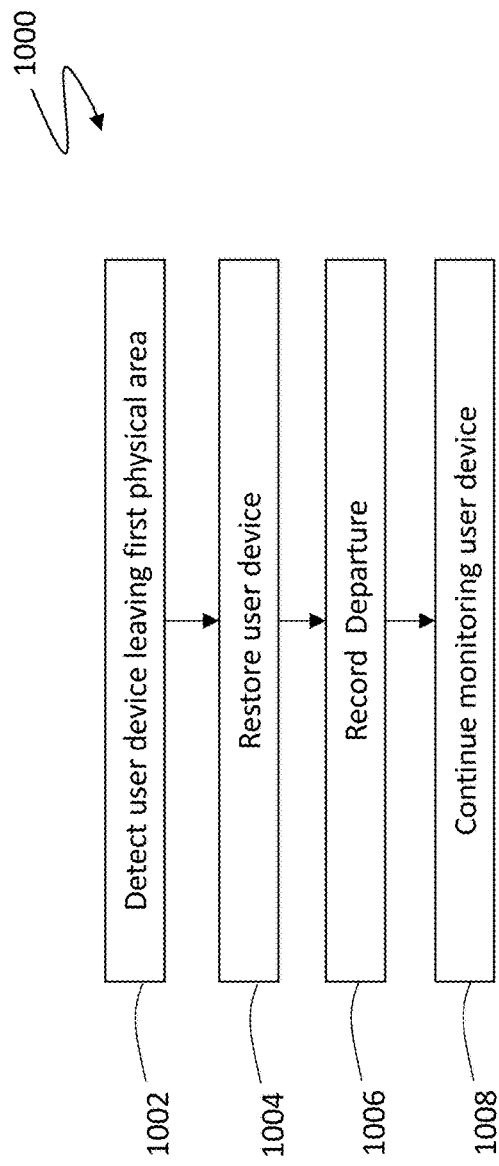
FIG. 10 is a flowchart illustrating managing departure of a visitor from a site, according to embodiments of the system described herein.

FIG. 10 is a flowchart 1000 illustrating managing a visitor's departure from a site, according to embodiments of the system described herein. The managing of a departure of a visitor from a site may include, for example, exiting active visitor mode.

Processing begins at a step 1002 where it may be detected that the user device is leaving the site. For example, monitoring the location of the user on the site may reveal that the visitor is approaching an exit and/or a reception or lobby of the site. For example, a gateway in a reception area or at a security gate may include a BT of WIFI device that detects when the user device of the visitor is approaching and/or has reached a predetermined distance from a gate, door, reception area or other point on the site.

Following the step 1002 is a step 1004 where the user device may be restored to a state of the user device that existed prior to entering the site. For example, any capabilities that were disabled when entering the site may be re-enabled. A transaction may have been recorded of the capabilities that were enabled or disabled upon arrival at the site and/or actions that were taken with respect to same. The transaction record may have been stored securely on the user device or remotely at a gateway and/or server, for example, as blockchain transaction record. This transaction record may be accessed as part of the step 1004 to determine how to restore the user device capabilities.

Following the step 1004 is a step 1006 where the departure of the visitor from the site may be recorded. For example, a gateway device located on the site (e.g., at or near the reception area), or the user device itself, or a monitoring device 123 that is designed according to FIG. 2 and contains an RFID NFC reader used as the sensor 220 communicating via RFID NFC, may exchange one or more communications with a server (e.g., in accordance with the streamlined blockchain communication sequence) resulting in a transaction record of the visitor departing the site being recorded in a secure transaction register. In some embodiments, in addition to the departure itself being recorded, information detected or determined (e.g., by the user device) during the visit, but not reported to a gateway and/or server during the visit, may be reported to the gateway and/or server and recorded, for example, in a same or similar manner as the reporting and recording of the visitor's departure.

Following the step 1006 is a step 1008 where, in some embodiments, the user device may continue to be monitored. For example, in some embodiments, the user of the user device may be involved in the transportation of goods or some other activity (e.g., which may be defined by a process object) for which it is desirable to continue to track the location of the user and/or the state of the goods, user device, monitoring or other thing involved in the transportation of the good (e.g., container, tank, pallet, packaging) even after the user has left the site. For example, the user may be a truck driver who transports goods to/from the site.

Figure 11:
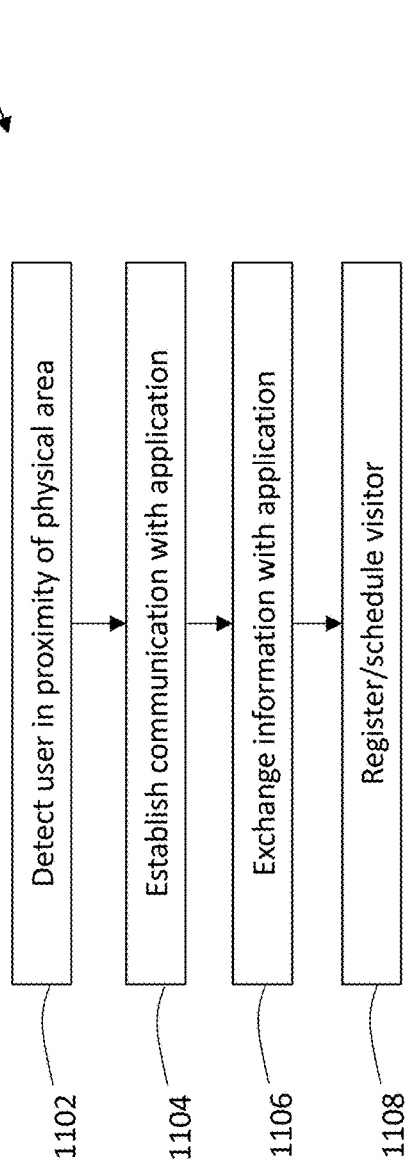
FIG. 11 is a flowchart illustrating remote interaction with a visitor outside of a physical area, according to embodiments of the system described herein.

FIG. 11 is a flowchart 1100 illustrating managing a visitor outside a physical area according to embodiments of the system described herein. At a first step, the visitor is detected as approaching the physical area, which may be a company site. The visitor may be a truck driver bring goods/supplies to the site. The detection may be provided by any appropriate mechanism, including mechanisms described herein. For example, the user mobile device may have already been registered with the system (i.e., remotely pre-registered prior to a visit) and the system may detect the specific user mobile device using GPS and the IMEI of the mobile device. Following the step 1102 is a step 1104 where communication is established with the user mobile device using, for example, a special application on the user mobile device that is provided and configured to exchange data with the system. Communication may be established using any appropriate mechanism, including mechanisms discussed herein, and the user mobile device may access the system using RESTful API calls. In some embodiments, the visitor enters credentials to the special application to provide authentication.

Following the step 1104 is a step 1106 where the system exchanges information with the user mobile device of the visitor. Information provided by the user mobile device may be anything, including, for example, information about the visitor, remote executed activities of the visitor, remote data, information about localization of the user mobile device, third party information to complement and improve scheduling of the visitor, load information indicating material being transported by the visitor to the physical area, a bill of lading, a certificate of analysis, and/or safety data sheets. Information may be exchanged using a blockchain or a hash of data corresponding to the information. Interaction times of the visitor corresponding to times that the visitor interacts with the special application may be recorded. Following the step 1106 is a step 1108 where the visitor is registered/scheduled. The system may schedule a visit by the visitor in response to the special application transmitting to the system, within a defined time interval, data heartbeats containing localization data. The system thus knows the location of the visitor and can estimate a time of arrival.

It should be appreciated that, at any point in time of the performance of methods illustrated by the flowcharts 700, 800, 900, 1000, 1100 an inventory of visitor information for any site may be taken, for example, from an inventory application of the transformation layer 102 of a thing management system. For example, a request or query may be submitted from a user device to an inventory application, and the inventory application may provide the requested information. For example, access status information of one or more visitors to a site may include any of the following:

IMEI of the user device of the visitor and the safety classification of the user device, e.g., Red, Yellow, Green.

Any information specified by the person object for the visitor, including, for example, processes for which the person is qualified.

Site enter/Exit records of the visitor

Alarms the Person has caused

Site map records of the visitor

Hazardous operations (e.g., alerts, locks, access codes) executed by the visitor on site It should be appreciated that methods illustrated by the flowcharts 700, 800, 900, 1000, 1100, one or more steps thereof and/or portions of the steps may be performed at least in part by the visitor access app 147 in conjunction with one or more other components of the user device 141, for example the security module 142, as well as in conjunction with one or more other components of the thing management network, for example, the gateway 120, one or more components of the service layer 110, and one or more components of the transformation layer 102, for example, one or more visitor access management application 104 (e.g., server portions thereof), transaction data management applications and/or safety management applications.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, firmware, hardware, a combination of software, firmware and/or hardware and/or other computer-implemented modules or devices having the described features and performing the described functions.

Software implementations of the system described herein may include executable code that is stored on one or more computer readable media and executed by one or more processors. Each of the one or more computer readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. In some embodiments of the system described herein, one or more computer media may be, include, or be included within a security module (which may include a TPM or SE) of a server, gateway, monitoring device, user device or other component of a thing management network, as described in more detail elsewhere herein, providing a secure environment for storing, executing and updating software implementations of the system described herein. The system described herein may be used in connection with any appropriate operating system.

Other embodiments of the system described herein will be apparent to those skilled in the art from a consideration of the specification or practice of the system disclosed herein. It is intended that the specification and examples be considered as exemplary only, with the true scope and spirit of the invention being indicated by the following claims.

What is claimed is:

1. A method of managing a visitor outside of a physical area, comprising:
   remotely registering the visitor to an access system by validating an application on a mobile user device of the visitor using compute resources of a security module, wherein the compute resources are physically secured against access by external components and processes;
   the application communicating with the access system using the compute resources of the security module;
   the visitor entering personnel credentials to authorize use of the application while the visitor is outside of the physical area; and
   in response to the visitor authorizing use of the application, the application and the access system exchanging data containing at least one of: information about the visitor, remote executed activities of the visitor, remote data, or information about localization of the user device.

2. The method of claim 1, wherein the application exchanges data with the access system using a RESTful API of the access system.

3. The method of claim 1, wherein data is formed in a blockchain transaction record prior to being exchanged between the mobile user device and the access system.

4. The method of claim 1, wherein the access system schedules a visit by the visitor in response to the application transmitting to the access system, within a defined time interval, data heartbeats containing localization data.

5. The method of claim 1, wherein the access system adds third party information to complement and improve scheduling of the visitor.

6. The method of claim 5, wherein the third party information includes load information indicating material being transported by the visitor to the physical area.

7. The method of claim 6, wherein the load information includes at least one of: a bill of lading, a certificate of analysis, or safety data sheets.

8. The method of claim 6, wherein the load information is sent to the access system using one of: a blockchain transaction record or a hash of data corresponding to the load information.

9. The method of claim 1, wherein the information about the visitor is entered using the application.

10. The method of claim 9, wherein the information about the visitor is sent to the access system using one of: a blockchain transaction record or a hash of data corresponding to the load information.

11. The method of claim 1, wherein interaction times of the visitor corresponding to times that the visitor interacts with the application are recorded.

12. The method of claim 11, wherein data corresponding to the interaction times is sent to the access system using one of: a blockchain transaction or a hash of data corresponding to the load information.

13. A non-transitory computer-readable medium containing software that manages a visitor outside of a physical area, the software comprising:
executable code that remotely registers the visitor to an access system by validating an application on a mobile user device of the visitor using compute resources of a security module, wherein the compute resources are physically secured against access by external components and processes;
executable code of the application that communicates with the access system using the compute resources of the security module, wherein the visitor enters personnel credentials to authorize use of the application while the visitor is outside of the physical area; and
executable code that causes the application and the access system to exchange data containing at least one of: information about the visitor, remote executed activities of the visitor, remote data, or information about localization of the user device in response to the visitor authorizing use of the application.

14. A system that manages a visitor outside of a physical area, comprising:
an access system that remotely registers a visitor thereto; and
a mobile user device of the visitor having a non-transitory computer-readable medium containing software that validates an application on the mobile user device using compute resources of a security module, wherein the compute resources are physically secured against access by external components and processes, the software also communicating with the access system using the compute resources of the security module, accepting personnel credentials from the user to authorize use of the application while the visitor is outside of the physical area, and, in response to the visitor authorizing use of the application, the application and the access system exchanging data containing at least one of: information about the visitor, remote executed activities of the visitor, remote data, or information about localization of the user device.

15. The method of claim 1, wherein the compute resources include a trusted platform module (TPM).

16. The method of claim 1, wherein the compute resources are provided in the user mobile device.

17. The method of claim 1, wherein the compute resources are provided in a dongle that is coupled to the user mobile device.

18. The method of claim 1, wherein the access system includes a cloud and a gateway coupled thereto and wherein the mobile user device communicates with the gateway.

19. The method of claim 18, wherein information is exchanged between the gateway and the mobile user device via an RFID NFC reader.

20. The non-transitory computer-readable medium of claim 13, wherein the application exchanges data with the access system using a RESTful API of the access system.

21. The non-transitory computer-readable medium of claim 13, wherein data is formed in a blockchain transaction record prior to being exchanged between the mobile user device and the access system.

22. The non-transitory computer-readable medium of claim 13, wherein the access system schedules a visit by the visitor in response to the application transmitting to the access system, within a defined time interval, data heartbeats containing localization data.

23. The non-transitory computer-readable medium of claim 13, wherein the access system adds third party information to complement and improve scheduling of the visitor.

24. The non-transitory computer-readable medium of claim 13, wherein the third party information includes load information indicating material being transported by the visitor to the physical area.

25. The non-transitory computer-readable medium of claim 24, wherein the load information includes at least one of: a bill of lading, a certificate of analysis, or safety data sheets.

26. The non-transitory computer-readable medium of claim 24, wherein the load information is sent to the access system using one of: a blockchain transaction record or a hash of data corresponding to the load information.

27. The non-transitory computer-readable medium of claim 13, wherein the information about the visitor is entered using the application.

28. The non-transitory computer-readable medium of claim 27, wherein the information about the visitor is sent to the access system using one of: a blockchain transaction record or a hash of data corresponding to the load information.

29. The non-transitory computer-readable medium of claim 13, wherein interaction times of the visitor corresponding to times that the visitor interacts with the application are recorded.

30. The non-transitory computer-readable medium of claim 29, wherein data corresponding to the interaction times is sent to the access system using one of: a blockchain transaction record or a hash of data corresponding to the load information.

31. The non-transitory computer-readable medium of claim 13, wherein the compute resources include a trusted platform module (TPM).

32. The non-transitory computer-readable medium of claim 13, wherein the compute resources are provided in the user mobile device.

33. The non-transitory computer-readable medium of claim 13, wherein the compute resources are provided in a dongle that is coupled to the user mobile device.

34. The non-transitory computer-readable medium of claim 13, wherein the access system includes a cloud and a gateway coupled thereto and wherein the mobile user device communicates with the gateway.

35. The non-transitory computer-readable medium of claim 34, wherein information is exchanged between the gateway and the mobile user device via an RFID NFC reader.

* * * * *